(12) United States Patent
Nakatani et al.

(10) Patent No.: US 10,095,274 B2
(45) Date of Patent: Oct. 9, 2018

(54) ELECTRONIC DEVICE

(71) Applicant: Panasonic Intellectual Property Management Co., Ltd., Osaka-shi, Osaka (JP)

(72) Inventors: Hitoshi Nakatani, Osaka (JP); Akira Iwamoto, Osaka (JP); Takeshi Mori, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 15/629,418

(22) Filed: Jun. 21, 2017

(65) Prior Publication Data

US 2017/0285689 A1     Oct. 5, 2017

Related U.S. Application Data

(63) Continuation of application No. PCT/JP2015/005896, filed on Nov. 27, 2015.

(30) Foreign Application Priority Data

Dec. 26, 2014  (JP) .................................. 2014-265964

(51) Int. Cl.
*G06F 1/16*     (2006.01)
*H05K 5/00*    (2006.01)
*H05K 7/00*    (2006.01)

(52) U.S. Cl.
CPC .......... *G06F 1/1654* (2013.01); *G06F 1/1616* (2013.01); *G06F 1/1681* (2013.01); *G06F 1/1626* (2013.01); *G06F 1/1632* (2013.01)

(58) Field of Classification Search
CPC ..... G06F 1/1616; G06F 1/1637; G06F 1/1679; G06F 1/1681; G06F 1/1626;
(Continued)

(56) References Cited

U.S. PATENT DOCUMENTS 5,619,397 A * 4/1997 Honda ................... G06F 1/1632
361/679.43
6,937,468 B2 * 8/2005 Lin ....................... G06F 1/1632
361/679.41

(Continued)

FOREIGN PATENT DOCUMENTS

| JP | 8-095669 | 4/1996 |
| JP | 11-122163 | 4/1999 |
| JP | 2014-099007 | 5/2014 |

*Primary Examiner* — Anthony Haughton
(74) *Attorney, Agent, or Firm* — Hamre, Schumann, Mueller & Larson, P.C.

(57) ABSTRACT

An electronic device includes a first unit (100) and a second unit detachable from each other. The second unit includes an input unit, a socket, and a hinge. The socket has a first wall and a second wall. In the first wall and the second wall, a length (L1) of a portion to support both ends of the longitudinal side of the first unit is greater than a length (L2) of a portion to support the region other than both ends of the longitudinal side of the first unit. The lengths (L1) and (L2) are perpendicular to the longitudinal side of the first unit. The portion to support the region other than both ends of the longitudinal side of the first unit has a linear opening-side end parallel to the longitudinal side of the first unit when the first and second walls are seen vertically.

3 Claims, 18 Drawing Sheets

(58) Field of Classification Search
CPC .... G06F 1/1632; G06F 1/1654; G06F 1/1669; G06F 1/1662; G06F 1/1618; E05B 65/0067
USPC .......... 361/679.27, 679.29, 679.3, 361/679.32–679.39, 679.55, 679.56, 361/679.57, 679.58
See application file for complete search history.

(56) References Cited

U.S. PATENT DOCUMENTS

| | | | | |
|---|---|---|---|---|
| 8,773,850 B2* | 7/2014 | Minaguchi | ............... | H04N 5/64 361/679.41 |
| 8,873,233 B2* | 10/2014 | Reber | ................. | H04M 1/04 361/679.01 |
| 8,922,994 B2* | 12/2014 | Zawacki | ............... | G06F 1/1683 292/30 |
| 9,223,344 B2* | 12/2015 | Wang | .................... | G06F 1/1632 |
| 9,256,256 B2* | 2/2016 | Liang | .................... | G06F 1/1632 |
| 9,451,822 B2* | 9/2016 | Gu | ........................ | A47B 23/044 |
| 9,575,513 B2* | 2/2017 | Nishioka | ............... | G06F 1/1669 |
| 2004/0246666 A1* | 12/2004 | Maskatia | ............... | G06F 1/1616 361/679.57 |
| 2011/0199727 A1* | 8/2011 | Probst | .................. | G06F 1/1628 361/679.09 |

* cited by examiner

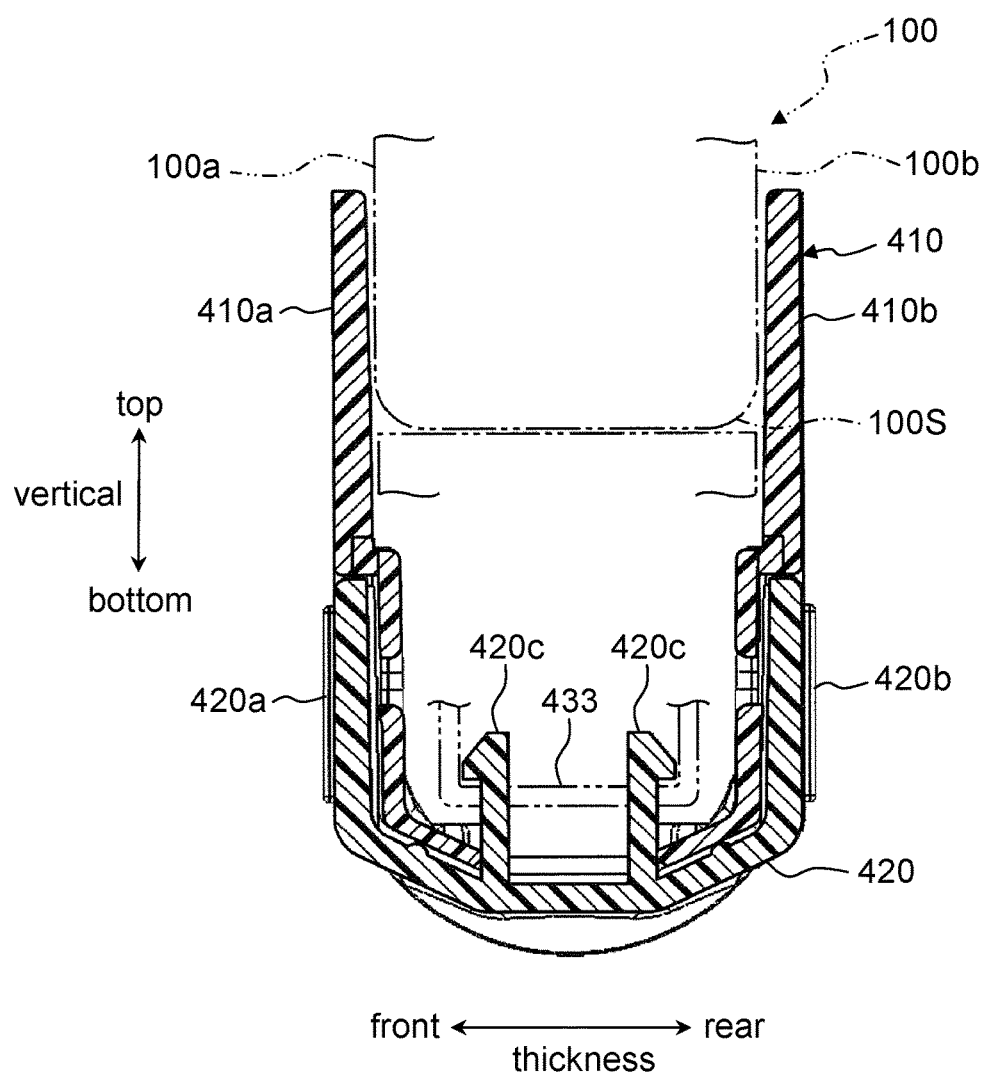

ELECTRONIC DEVICE

TECHNICAL FIELD

The present disclosure relates to an electronic device including a first unit and a second unit detachable from each other. The first unit includes a display unit, and the second unit includes an input part.

BACKGROUND ART

Patent Literature 1 discloses a structure in which a tablet computer (first unit) is detachable from a station (second unit) including a keyboard. More specifically, in Patent Literature 1, the station includes an attachment part to which the tablet computer can be attached. The attachment part has nearly the same width as the lateral part of the station to which the tablet computer is attached. The attachment part is equipped with projections protruding from both lateral ends of the attachment part in a direction perpendicular to the lateral part. The tablet computer is provided, at both ends of its lateral part, with to-be-engaged portions, which can be engaged with the projections of the station.

CITATION LIST

Patent Literature

PTL 1: Unexamined Japanese Patent Publication No. 2014-99007

SUMMARY OF THE INVENTION

The electronic device of the present disclosure includes a first unit including a display unit and a second unit including an input part, and the first and second units are detachable from each other. The first unit has a first main surface including the display unit and a second main surface substantially parallel to the first main surface. The second unit includes an input unit including the input part, a socket capable of accommodating the first edge part of the first unit, and a hinge coupling the input unit and the socket together at the second edge part of the input unit and at the third edge part of the socket, so that the input unit and the socket are rotatable with respect to each other.

The socket has a first wall and a second wall. The first wall is parallel to the longitudinal side of the first edge part so as to support the first edge part from the first main surface when the first edge part is accommodated in the socket. The second wall is parallel to the longitudinal side of the first edge part so as to support the first edge part from the second main surface when the first edge part is accommodated in the socket.

Each of the first and second walls has a pair of portions to support both ends of the longitudinal side of the first edge part, and a portion to support the region other than both ends of the longitudinal side of the first edge part. At least one of the pair of portions has a length greater than the length of the portion to support the region other than both ends of the longitudinal side of the first edge part. These lengths are perpendicular to the longitudinal side of the first edge part.

The portion to support the region other than both ends of the longitudinal side of the first edge part has a linear opening-side end parallel to the longitudinal side of the first edge part when the first wall and the second wall are seen vertically.

According to the present disclosure, in each of the first and second walls, at least one of the pair of portions to support both ends of the longitudinal side of the first edge part is greater in length perpendicular to the longitudinal side of the first edge part than the portion to support the region other than both ends of the longitudinal side of the first edge part. As a result, the first unit can be firmly held in the socket of the second unit.

BRIEF DESCRIPTION OF DRAWINGS

FIG. 10 is a sectional view of some components of the socket taken along line 10-10 of FIG. 12B.

DESCRIPTION OF EMBODIMENT(S)

Exemplary embodiments will be described in detail as follows with reference to the accompanying drawings. In the exemplary embodiments, the description of well-known matter and of substantially the same configuration as described earlier may be omitted to avoid redundancy and help those skilled in the art understand them easily.

Note that the attached drawings and the following description are provided to make those skilled in the art fully understand the present disclosure, and are not intended to limit the claimed subject matter.

First Exemplary Embodiment

A first exemplary embodiment will now be described with reference to the accompanying drawings.

1. Structure 1-1. Overview of the Electronic Device

Figure 1:
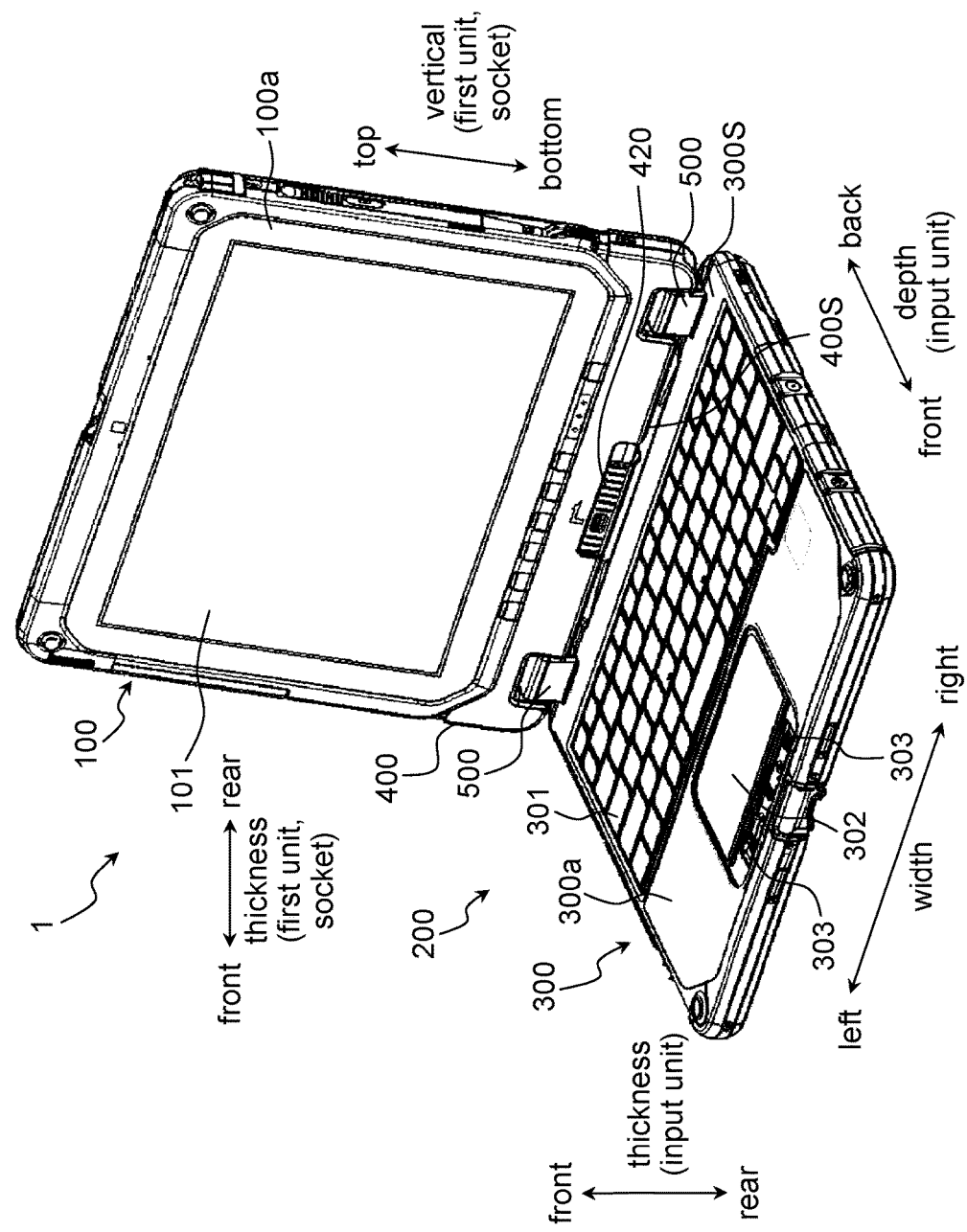
FIG. 1 is a front perspective view of an electronic device according to a first exemplary embodiment.
Figure 2:
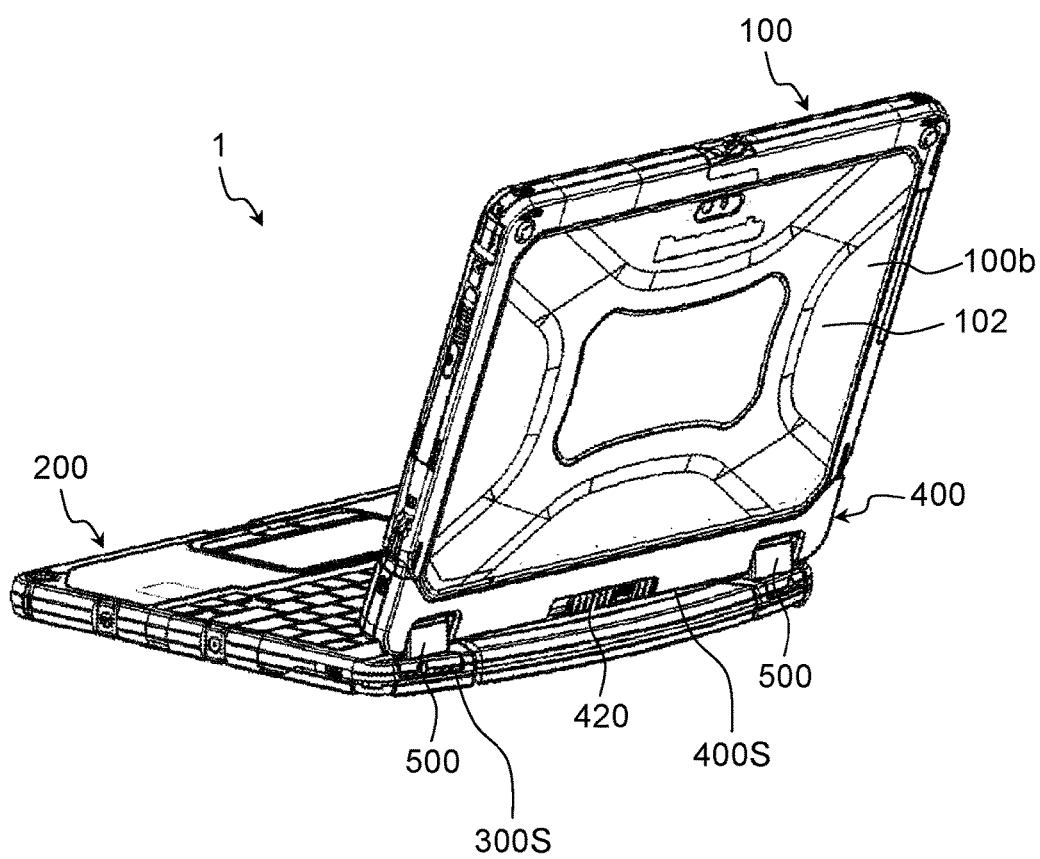
FIG. 2 is a rear perspective view of the electronic device according to the exemplary embodiment.

FIG. 1 is a front perspective view of electronic device 1 according to the present exemplary embodiment. In FIG. 1, electronic device 1 is in the opened state. FIG. 2 is a rear perspective view of electronic device 1. In some drawings including FIG. 1, the orientations of components and units are defined as follows. The orientation of width is common to electronic device 1, first unit 100, second unit 200, input unit 300, and socket 400. Therefore, in the following description, the term "width" may be referred to without specifying the name of the unit being focused. In the present exemplary embodiment, hinge 500, which will be describe later, has an axis of rotation parallel to the above-mentioned "width". Some drawings other than FIG. 1 define the orientation of each unit being focused. However, the definition is only for convenience of explanation, and does not specify the absolute position or orientation of each unit when it is actually in use.

As shown in FIG. 1, electronic device 1 includes first unit 100 (tablet computer) and second unit 200 (including keyboard 301 and other components). First unit 100 and second unit 200 are detachable from each other, making electronic device 1 what is called a "detachable computer".

Figure 3A:
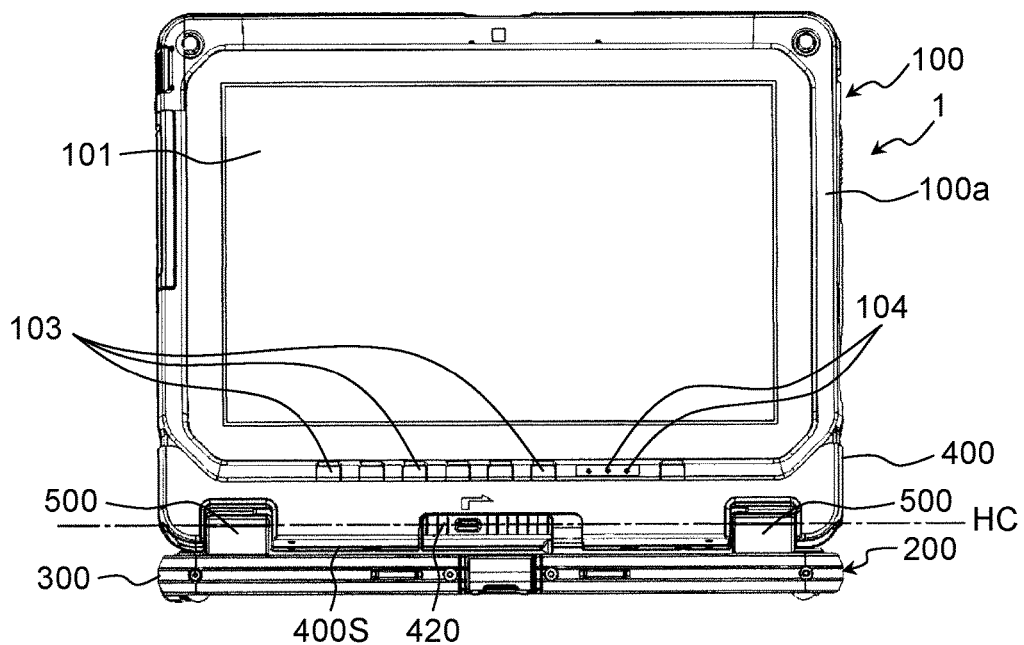
FIG. 3A is a front view of the electronic device according to the exemplary embodiment in which a first unit is fitted into a second unit.
Figure 3B:
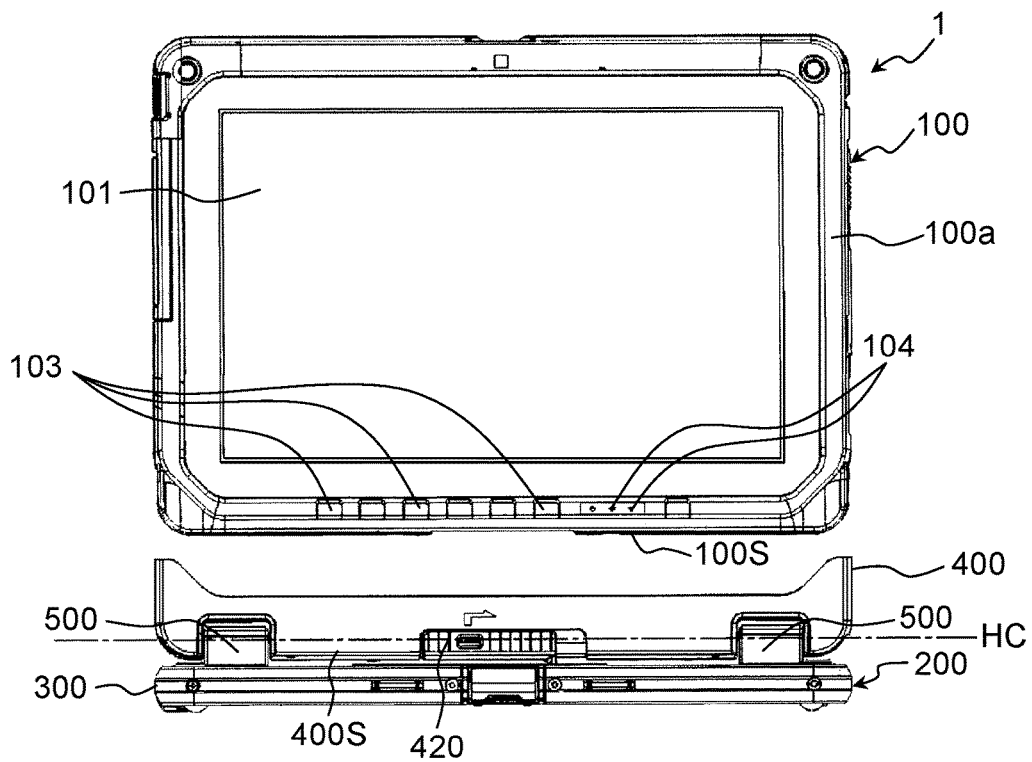
FIG. 3B is a front view of the electronic device according to the exemplary embodiment in which the first unit is detached from the second unit.

FIGS. 3A and 3B are front views of electronic device 1. More specifically, first unit 100 is fitted in second unit 200 in FIG. 3A and is detached from it in FIG. 3B.

As shown in FIGS. 1 to 3B, first unit 100 is a tablet computer. First unit 100 includes display unit 101 on first main surface 100a, which is the front surface of the thickness. Display unit 101 can be, for example, a liquid crystal display panel or a touch panel, which allows the user to enter data. First unit 100 contains a central processing unit (CPU), a volatile storage device such as a RAM, a nonvolatile storage device such as a ROM or an SSD, and a battery. First unit 100 further includes detachable lid 102 on second main surface 100b, which is the rear surface of the thickness. The nonvolatile storage device contains an operating system (OS), application programs, various data, etc. The CPU reads the OS, the application programs, and the data to perform arithmetic processing, thereby achieving various functions.

Second unit 200, from which first unit 100 can be detached, includes an input part into which the user can enter data. Second unit 200 further includes input unit 300, socket 400, and hinge 500.

Input unit 300 has a housing made, for example, of metal such as magnesium alloy or resin. Input unit 300 has main surface 300a, which is the front surface of the thickness. Main surface 300a is equipped with the input part including keyboard 301, touch pad 302, and operating buttons 303.

Socket 400 can accommodate a bottom 100S of first unit 100 (hereinafter also referred to simply as "the bottom 100S", or "the first edge part"). Hinge 500 couples input unit 300 and socket 400 together at a back 300S of the depth of input unit 300 and at a bottom 400S of socket 400 so that input unit 300 and socket 400 are rotatable with respect to each other. The back 300S is hereinafter also referred to simply as "the back 300S" or "the second edge part", while the bottom 400S is hereinafter also referred to simply as "the bottom 400S" or "the third edge part". Hinge 500 has an axis of rotation HC parallel to the width of electronic device 1. This enables first unit 100 and second unit 200 to be held open at an angle of, for example, about 100 degrees as shown in FIGS. 1 and 2. This also enables first unit 100 to be closed over second unit 200, so that first main surface 100a of first unit 100 and main surface 300a of input unit 300 of second unit 200 can be close to each other and almost parallel to each other.

Socket 400 includes connector 460, which can be coupled with connector 120 (cf. FIG. 4) of first unit 100 when the bottom 100S of first unit 100 is accommodated in socket 400. First unit 100 and second unit 200 can exchange various signals and power via connectors 120 and 460. For example, second unit 200 can provide first unit 100 with signals outputted from the input part of input unit 300, such as keyboard 301, touch pad 302, or operating buttons 303. First unit 100 can receive these signals and perform control based on the signals. Thus, electronic device 1 enables the user to use first unit 100 and second unit 200 together as a notebook computer, or first unit 100 alone as a tablet computer.

1-2. Structure of the Locking Mechanism

Electronic device 1 of the present exemplary embodiment includes a locking mechanism, which prevents erroneous detachment of first unit 100 from second unit 200. In other words, the locking mechanism ensures the coupling between first unit 100 and second unit 200. The locking mechanism will now be described in detail.

Figure 4:
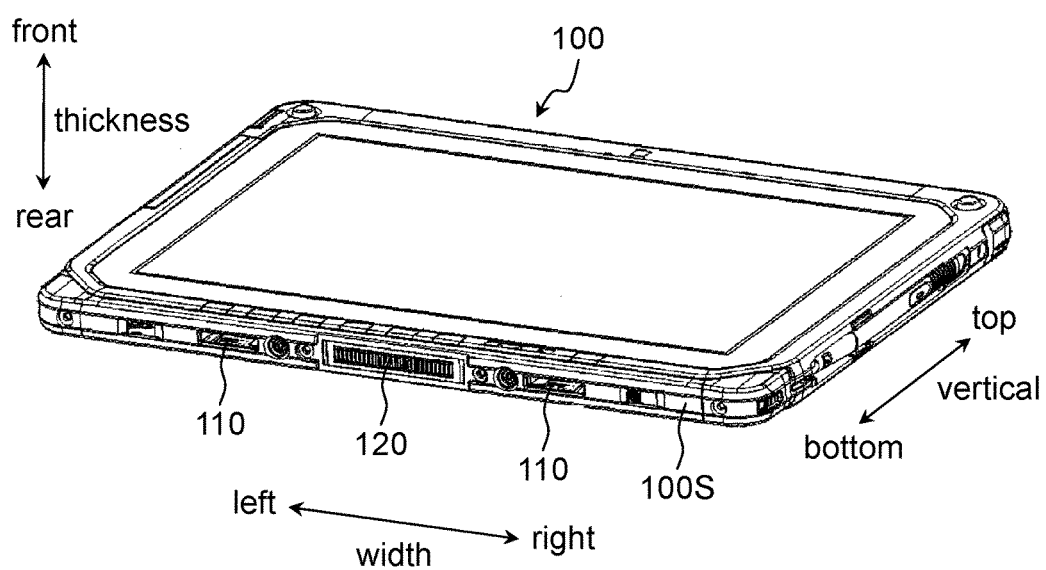
FIG. 4 is a perspective view of the first unit (tablet computer) of the electronic device according to the exemplary embodiment.

1-2-1. Structure of Components of the Locking Mechanism that are Contained in the First Unit FIG. 4 is a perspective view of first unit 100 (tablet computer) of electronic device 1. First unit 100 has, in the bottom 100S, to-be-engaged portions 110, which are the components of the locking mechanism that are contained in first unit 100. To-be-engaged portions 110 can be engaged with engaging members 443 (cf. FIG. 7A) of engaging portions 440, which are components of the locking mechanism that are contained in second unit 200. The two to-be-engaged portions 110 are located apart from each other in the bottom 100S along the width of first unit 100.

Figure 5:
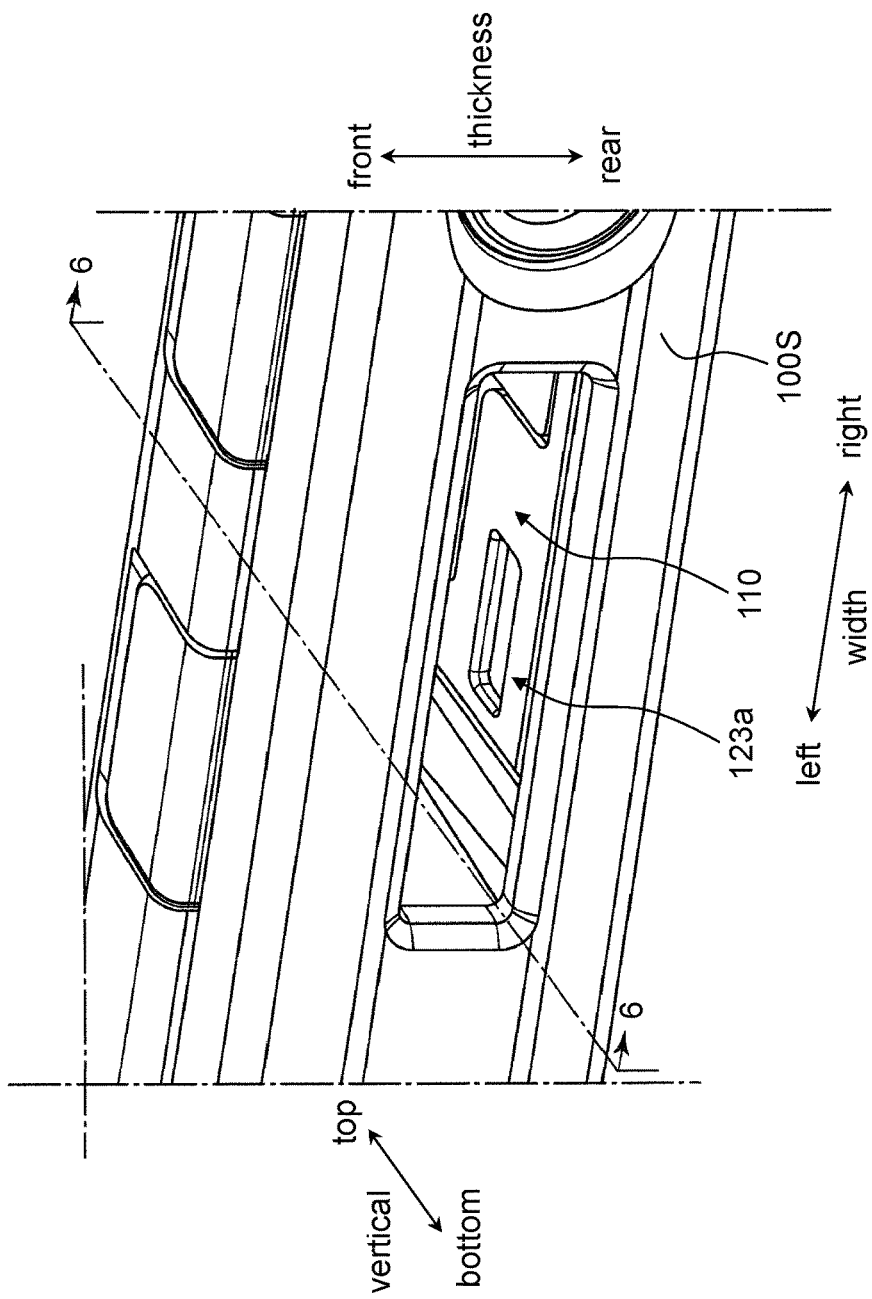
FIG. 5 is an enlarged perspective view of a to-be-engaged portion of the first unit of the electronic device according to the exemplary embodiment.
Figure 6:
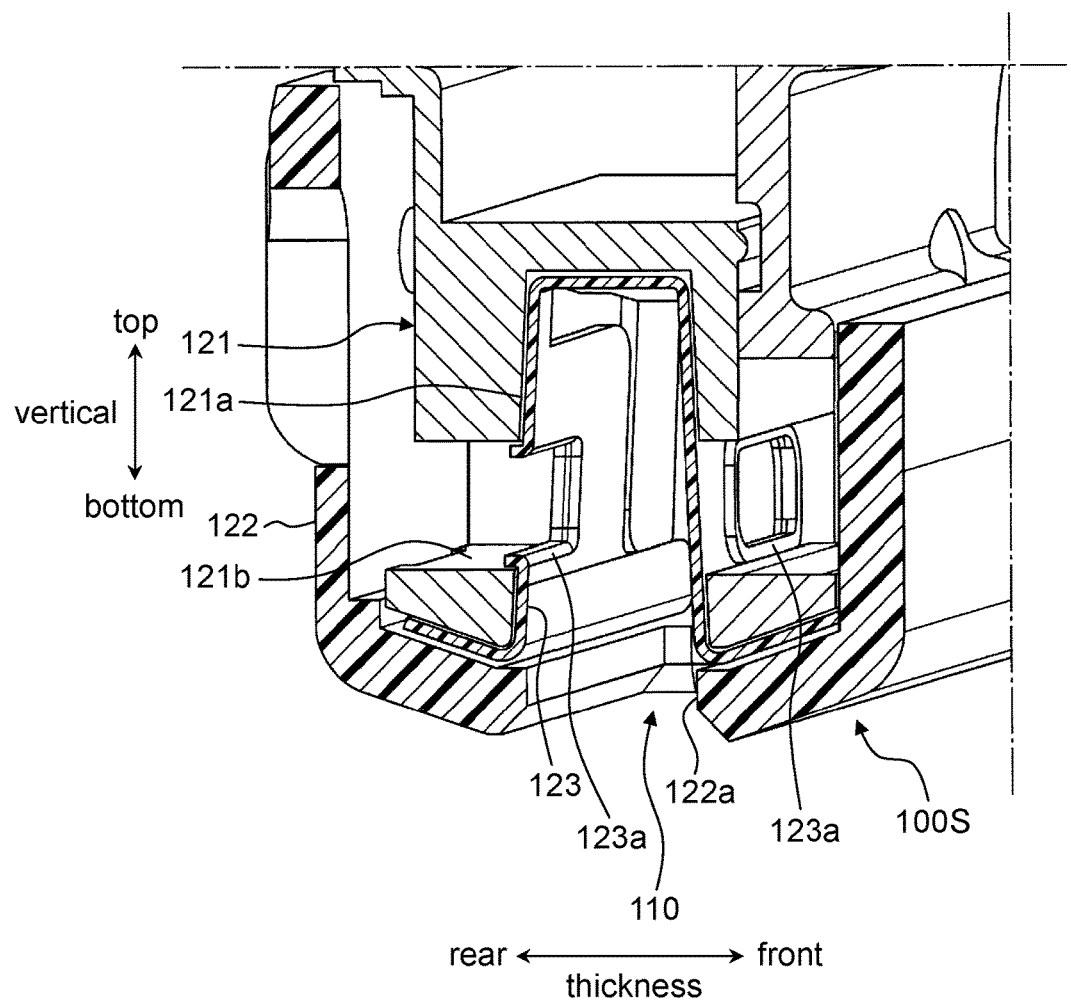
FIG. 6 is a sectional view of the first unit taken along line 6-6 of FIG. 5.

FIG. 5 is an enlarged perspective view of one of to-be-engaged portions 110 of first unit 100. FIG. 6 is a sectional view of the first unit 100 taken along line 6-6 of FIG. 5.

As shown in these drawings, to-be-engaged portions 110 are recesses to be engaged with engaging members 443, which will be described later. First unit 100 includes metal frame 121 and side cover 122 made of resin. Frame 121 composes the framework of first unit 100 and a part of the outer surface of first unit 100. Side cover 122 is a frame member covering the outer surface of the bottom 100S of first unit 100. Frame 121 has recesses 121a, and side cover 122 has openings 122a. The inner surface of each recess 121a in frame 121 is provided with metal protective member 123. Protective members 123 have engaging holes 123a to be engaged with after-mentioned engaging pieces 443a (cf. FIG. 7B) of engaging members 443. Frame 121 further includes, in recesses 121a, engagement recesses 121b, which can be engaged with engaging pieces 443a of engaging members 443. Protective members 123 are preferably made of stainless steel rather than magnesium so as to be less likely to be worn out.

1-2-2. Structure of the Components of the Locking Mechanism that are Contained in the Second Unit and Structure of the Socket 1-2-2-1. Structure of the Socket The components of the locking mechanism that are contained in second unit 200 are stored in socket 400.

Figure 7A:
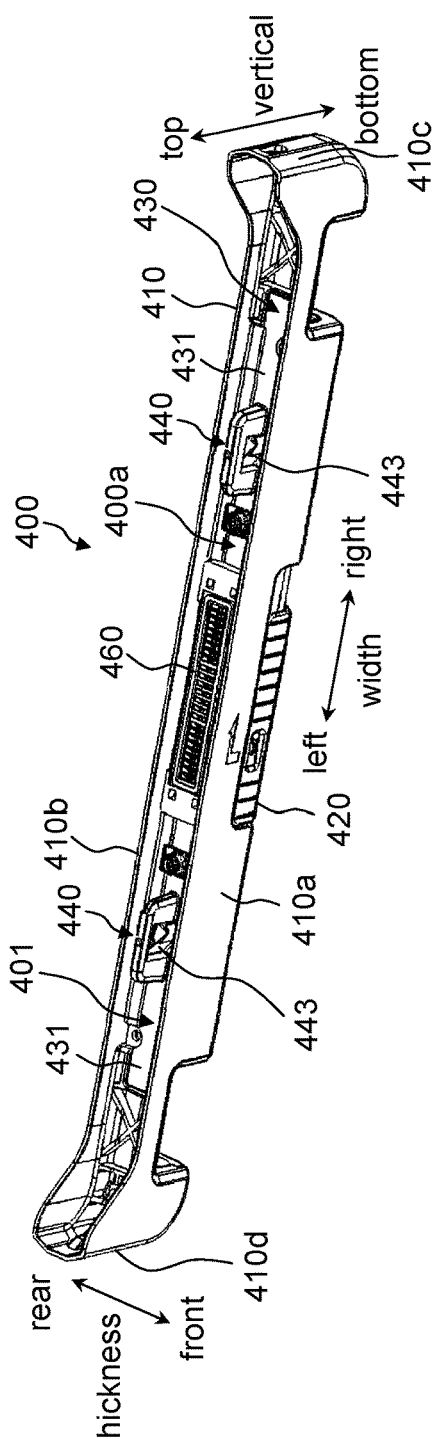
FIG. 7A is a perspective view of a socket of the second unit of the electronic device according to the exemplary embodiment in which engaging members are in first rotation position.
Figure 7B:
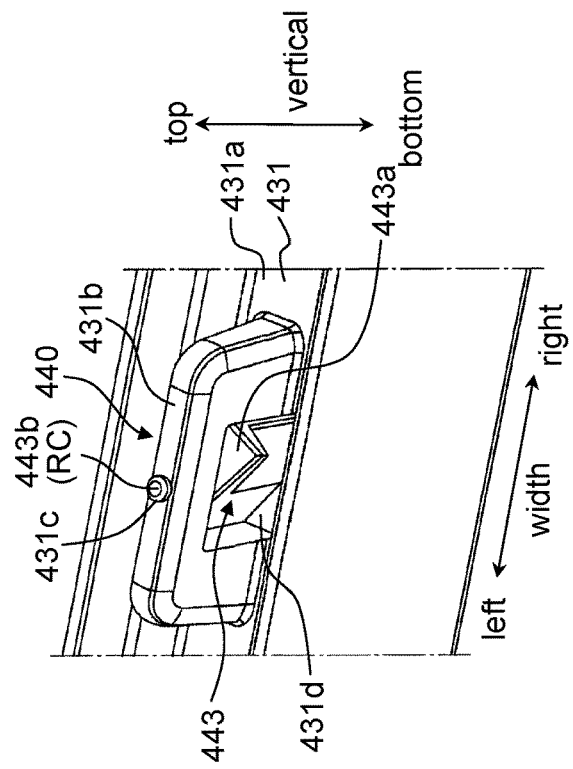
FIG. 7B is an enlarged perspective view of one of the engaging members and its vicinity in the socket of the second unit of the electronic device according to the exemplary embodiment in which the engaging member is in the first rotation position.

FIGS. 7A and 7B are external views of socket 400 of electronic device 1 in which engaging members 443 are in first rotation position. More specifically, FIG. 7A is a perspective view of socket 400, and FIG. 7B is an enlarged perspective view of one of engaging members 443 and its vicinity.

Figure 8A:
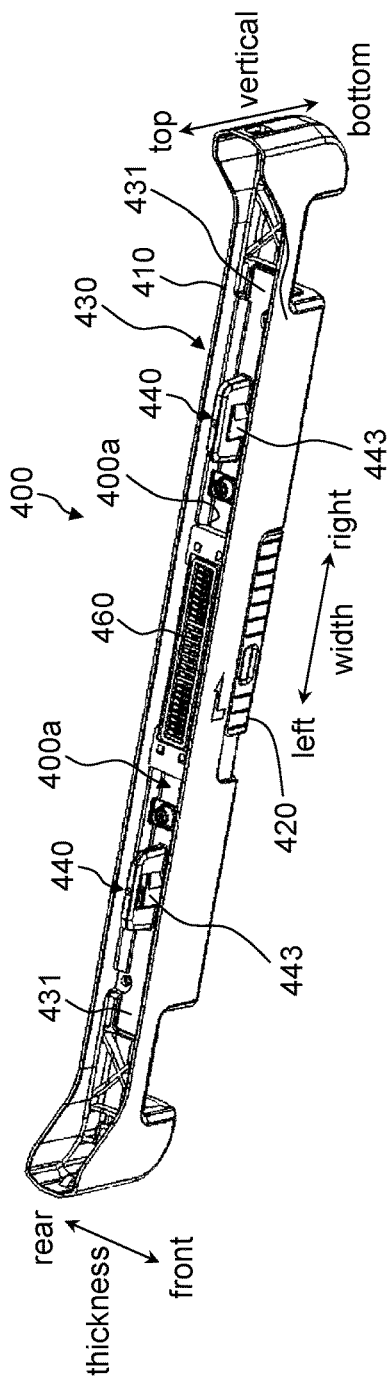
FIG. 8A is a perspective view of the socket of the second unit of the electronic device according to the exemplary embodiment in which the engaging members are in second rotation position.
Figure 8B:
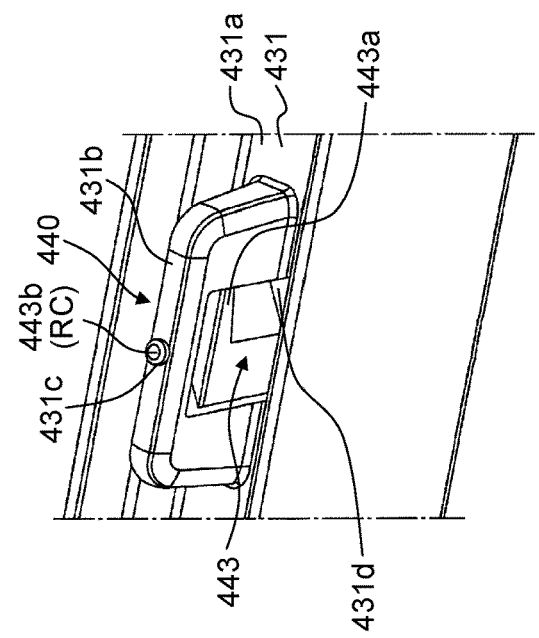
FIG. 8B is an enlarged perspective view of one of the engaging members and its vicinity in the socket of the second unit of the electronic device according to the exemplary embodiment in which the engaging member is in the second rotation position.

FIGS. 8A and 8B are external views of socket 400 in which engaging members 443 are in second rotation position. More specifically, FIG. 8A is a perspective view of socket 400, and FIG. 8B is an enlarged perspective view of one of engaging members 443 and its vicinity.

Figure 11:
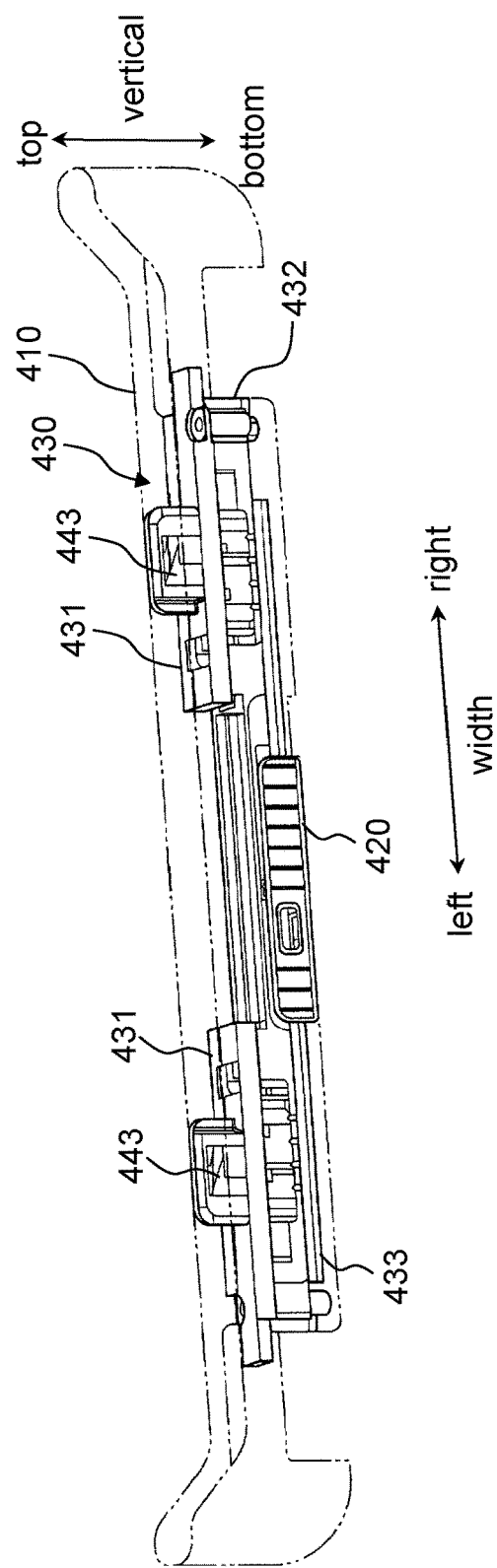
FIG. 11 is a perspective view of components of a locking mechanism that are contained in the socket of the electronic device according to the exemplary embodiment.

Socket 400 includes socket body 410, operating member 420, engaging portions 440 including engaging members 443, and drive mechanism 430 (cf. FIG. 11).

Socket 400 is ship-shaped and along the width of electronic device 1, and has recess 400a into which the bottom 100S of first unit 100 can be fitted.

Engaging portions 440 can be engaged with to-be-engaged portions 110 of the bottom 100S of first unit 100, which will be described later. Each of engaging members 443 is rotatable about the axis of rotation RC (the center of each rotating shaft 443b), which is parallel to the vertical side of socket 400, as will be described in detail later. The two engaging members 443 are located apart from each other on the top surfaces of base parts 431a of support members 431 along the width of socket 400. Thus, two engaging members 443 can be engaged with to-be-engaged portions 110 of first unit 100 when the bottom 100S of first unit 100 is fitted into socket 400. Engaging members 443 protrude higher than the top surfaces (the predetermined surface of the second unit) of base parts 431a of support members 431.

When operating member 420 is in first position shown in FIG. 7A, engaging members 443 rotate to the first rotation position and get engaged with to-be-engaged portions 110. The first position is a predetermined left position along the width. The first rotation position is where engaging pieces 443a of engaging members 443 protrude beyond engaging-member supporters 431b of support members 431 from both sides of the thickness. Meanwhile, when operating member 420 is in second position shown in FIG. 8A, engaging members 443 rotate to the second rotation position and get disengaged from to-be-engaged portions 110. The second position is a predetermined right position along the width. The second rotation position is where engaging pieces 443a of engaging members 443 do not protrude beyond engaging-member supporters 431b of support members 431 in the thickness.

1-2-2-2. Socket Body

Figure 9A:
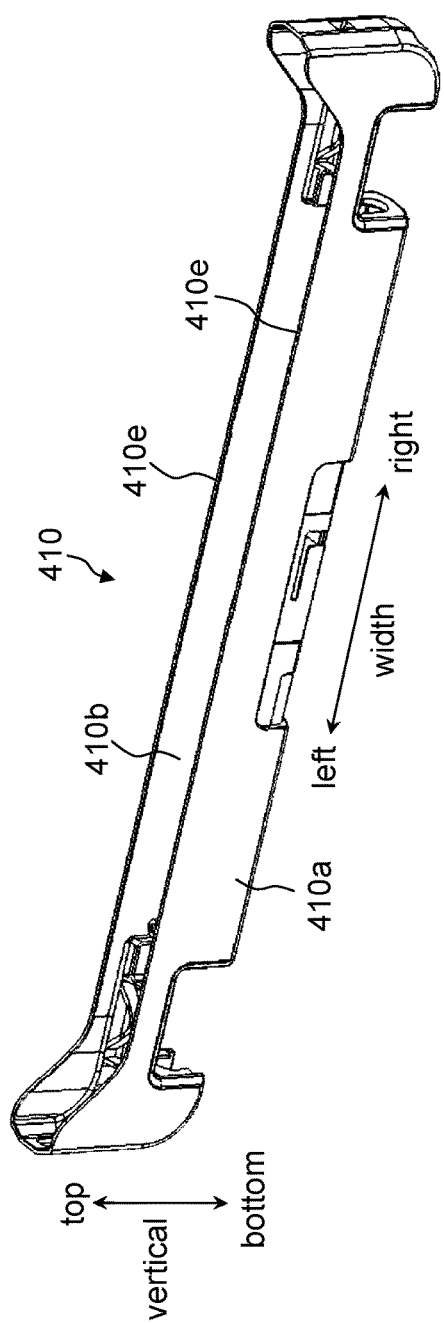
FIG. 9A is a perspective view of a socket body of the electronic device according to the exemplary embodiment.
Figure 9B:
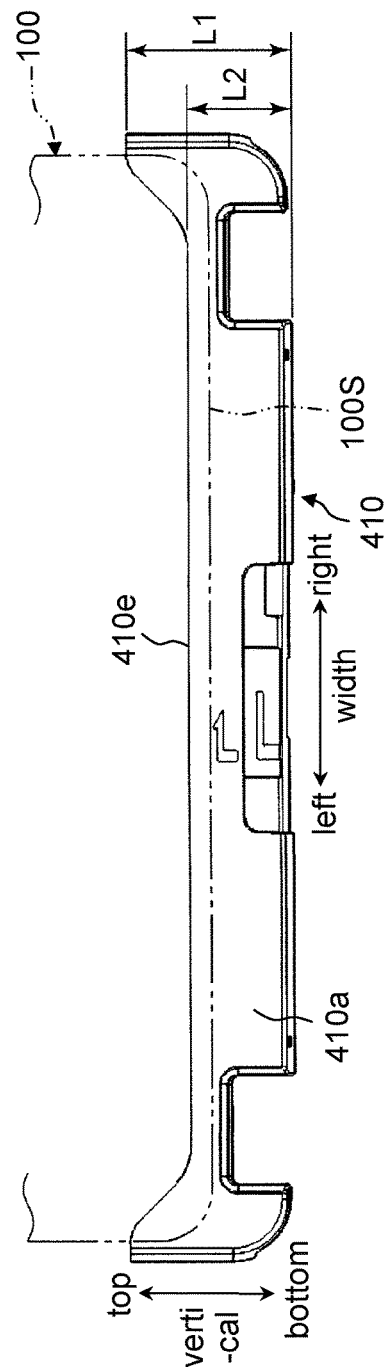
FIG. 9B is a side view of the socket body of the electronic device according to the exemplary embodiment.

FIGS. 9A and 9B are external views of socket body 410 of electronic device 1. More specifically, FIGS. 9A and 9B are a perspective view and a side view, respectively, of socket body 410.

Socket body 410 is ship-shaped and stores drive mechanism 430 (cf. FIG. 11). Socket body 410 is made of resin, but may alternatively be made of metal such as magnesium alloy.

Figure 12A:
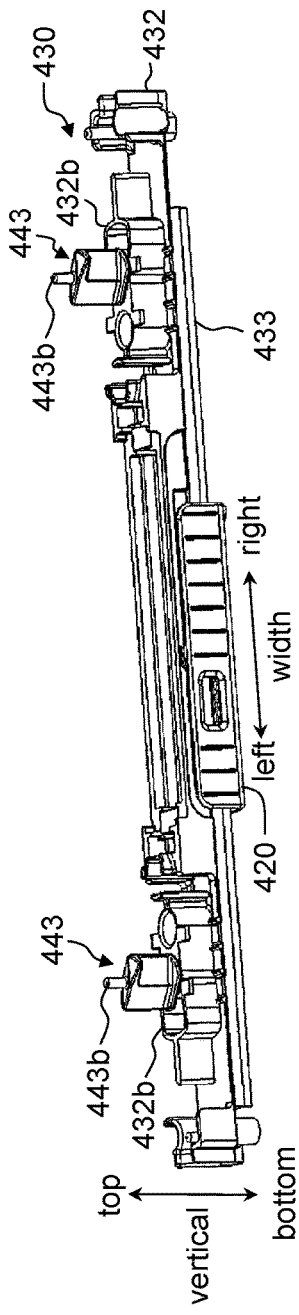
FIG. 12A is a perspective view of some components of the locking mechanism that are contained in the socket of the electronic device according to the exemplary embodiment.
Figure 12B:
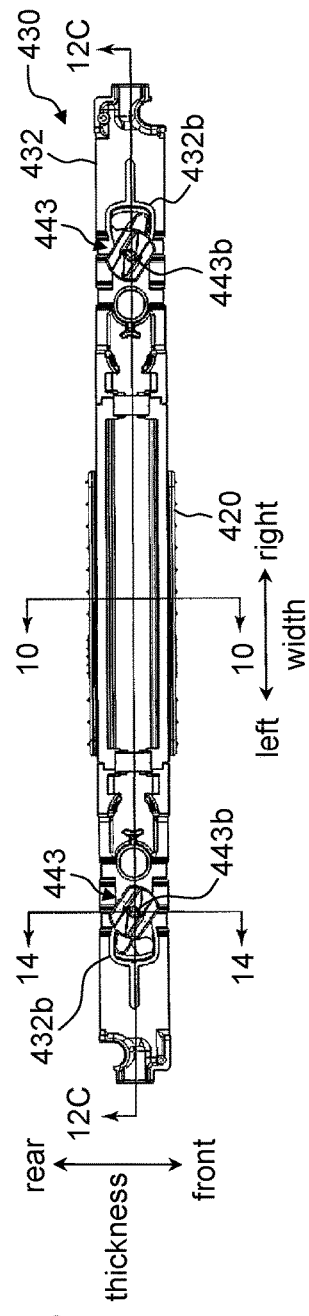
FIG. 12B is a plan view of some components of the locking mechanism that are contained in the socket of the electronic device according to the exemplary embodiment.

FIG. 10 is a sectional view of some components of socket 400 taken along line 10-10 of FIG. 12B. More specifically, FIG. 10 shows socket 400 in the cross section perpendicular to its width (in other words, its length or longitudinal side) along line 10-10. In the present exemplary embodiment, the width, length, and longitudinal side are all the same with respect to socket 400, the bottom 100S, and the back 300S; however, for easier understanding, any of these terms may be used depending on the description of each of these elements. Socket body 410 has first wall 410a and second wall 410b. First wall 410a becomes parallel to the longitudinal side of the bottom 100S and also to first main surface 100a of first unit 100 when the bottom 100S is accommodated in socket 400 (cf. FIG. 9B). First wall 410a supports the bottom 100S from first main surface 100a. Second wall 410b becomes parallel to the longitudinal side of the bottom 100S and also to second main surface 100b (the rear surface) of first unit 100 when the bottom 100S is accommodated in socket 400 (cf. FIGS. 9A and 9B). Second wall 410b supports the bottom 100S from second main surface 100b.

Socket body 410 has an substantially U-shaped cross section perpendicular to its longitudinal side.

According to the above described structure, first unit 100 is supported at the bottom 100S by socket 400 with first main surface 100a and second main surface 100b sandwiched between first wall 410a and second wall 410b of socket 400.

As shown in FIGS. 3A and 3B, electronic device 1 includes operating switches 103 and indicators 104, which are located in the bottom 100S under display unit 101 on first main surface 100a of first unit 100 and are in the middle region of the width of socket 400. The middle region is the region other than both ends of the longitudinal side of socket 400. Because of the presence of operating witches 103 and indicators 104, first wall 410a should have a vertical length (height) not reaching operating switches 103 or indicators 104 in the middle region of socket 400.

To achieve this, in the present exemplary embodiment, socket body 410 has a length L1 greater than the length L2 as shown in FIG. 9B. The length L1 is the vertical length of first and second walls 410a and 410b at both ends of the width (the longitudinal side) of socket 400. The length L2 is the vertical length of first and second walls 410a and 410b at the region other than both ends of the width (the longitudinal side) of socket 400. These vertical lengths of first and second walls 410a and 410b are perpendicular to the longitudinal side of socket 400. Each of first wall 410a and second wall 410b has opening-side end 410e in the middle region of the width (in a portion to support the region other than both ends of the longitudinal side) of socket 400. When the socket body is seen from a lateral side (when the first and second walls are seen vertically) as shown in FIG. 9B, opening-side end 410e is straight along the width (the longitudinal side).

With this configuration, even if operating switches 103 (second operating unit) and/or indicators 104 are located in the middle region of the width in the bottom 100S of first main surface 100a, first unit 100 can be supported at both ends of its width by first and second walls 410a and 410b having a greater vertical height than in the middle region. As a result, first unit 100 can be firmly held in socket 400 of second unit 200. Since opening-side end 410e in the middle region of socket 400 is straight in parallel with the width of socket 400, first unit 100 can be smoothly fitted into socket 400 without being hindered by anything.

As shown in FIG. 7A, socket body 410 further has third wall 410c and fourth wall 410d. Third wall 410c couples first wall 410a and second wall 410b together at their right ends of the width (the longitudinal side). Fourth wall 410d couples first wall 410a and second wall 410b together at their left ends of the width.

These two walls improve the strength of socket 400 (socket body 410). For example, first wall 410a and second wall 410b are prevented from falling apart from each other, thereby more firmly supporting first unit 100 in socket 400 of second unit 200.

1-2-2-3. Operating Member

Operating member 420 receives a command from the user to release the locking mechanism. Member 420 is made of resin, but may alternatively be made of metal such as magnesium alloy. Member 420 is supported by socket 400 so as to move linearly between the first and second positions along the width of socket 400 with respect to socket body 410.

As shown in FIGS. 1 and 2, when the bottom 100S of first unit 100 is accommodated in socket 400, operating member 420 is operable from either first main surface 100a or second main surface 100b of first unit 100. This configuration will now be described in detail.

FIG. 10 is a sectional view of some components of socket 400 taken along line 10-10 of FIG. 12B. As shown in FIG. 10, operating member 420 includes first operating unit 420a and second operating unit 420b located on the outer surface of first wall 410a and second wall 410b, respectively, of socket body 410. First operating unit 420a and second operating unit 420b are coupled together at their bottoms so that operating member 420 can slide on the outer surface of socket 400 along its width (longitudinal side). Operating member 420 has an substantially U-shaped cross section perpendicular to width (longitudinal side) of socket 400. With this configuration, the user can operate operating member 420 from either main surface of first unit 100 by operating either first operating unit 420a or second operating unit 420b. For example, when first unit 100 is opened from second unit 200 as shown in FIG. 1, the user can operate first operating unit 420a from first main surface 100a including display unit 101 that the user faces. Meanwhile, when first unit 100 is closed on second unit 200, the user cannot operate first operating unit 420a from first main surface 100a, but can operate second operating unit 420b from second main surface 100b.

Furthermore, in the above-described configuration, since socket 400 and operating member 420 have an substantially U-shaped cross section, the internal space of socket 400 can be effectively used to store various members and mechanisms. In the present exemplary embodiment, the internal space of socket 400 is used to store drive mechanism 430, which disengages the locking mechanism as will be described later. The space can accommodate other members in addition to drive mechanism 430.

1-2-2-4. Engaging Members and Drive Mechanism

FIG. 11 is a perspective view of components of the locking mechanism that are contained in socket 400 of electronic device 1.

The components of the locking mechanism that are contained in socket 400 include operating member 420 mentioned above, engaging members 443, and drive mechanism 430.

1-2-2-4-1. Drive Mechanism

Drive mechanism 430 makes engaging members 443 rotate to the first rotation position shown in FIGS. 7A and 7B when operating member 420 is moved to the first position shown in FIG. 7A, and also makes engaging members 443 rotate to the second rotation position shown in FIGS. 8A and 8B when operating member 420 is moved to the second position shown in FIG. 8A. In short, drive mechanism 430 converts the linear movement of operating member 420 between the first and second positions into the rotation of engaging members 443 between the first and second rotation positions.

Drive mechanism 430 includes support members 431, base 432, and coupling member 433.

Figure 12C:
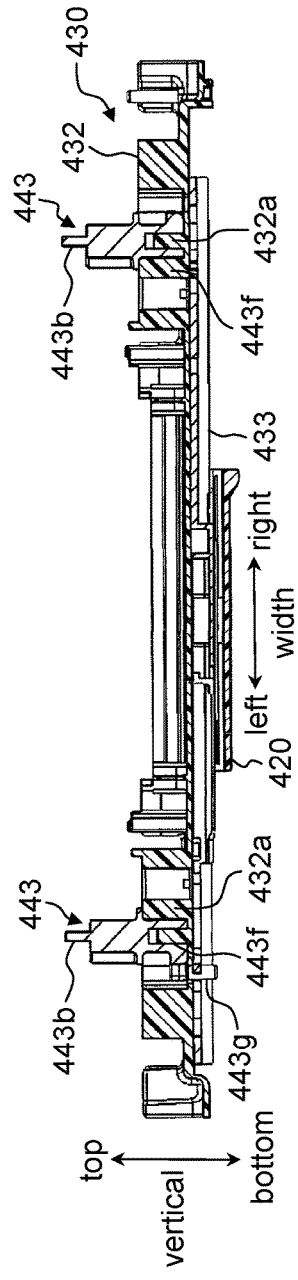
FIG. 12C is a sectional view of some components of the locking mechanism taken along line 12C-12C of FIG. 12B.

FIGS. 12A to 12C are external views of some components of the locking mechanism that are contained in socket 400. More specifically, FIG. 12A is a perspective view, FIG. 12B is a plan view, FIG. 12C is a sectional view of some components of the locking mechanism taken along line 12C-12C of FIG. 12B.

Coupling member 433 is a planar member laid along the width of socket 400 and is fixed to operating member 420. For example, as shown in FIG. 10, coupling member 433 is fixed to operating member 420 by being engaged with engaging projections 420c extending upward in operating member 420. Coupling member 433 is supported by socket body 410 so as to be movable in the direction that moves operating member 420 (along the width of socket 400). Coupling member 433 is made, for example, of resin, but may alternatively be made of any metal that is nearly as slidable as resin.

Coupling member 433 has grooves 433a and 433b (cf. FIGS. 15A, 15B, 17A, 17B). These grooves 433a and 433b are engaged with engaging shafts 443g of engaging members 443 in a manner movable relative to each other.

Figure 15A:
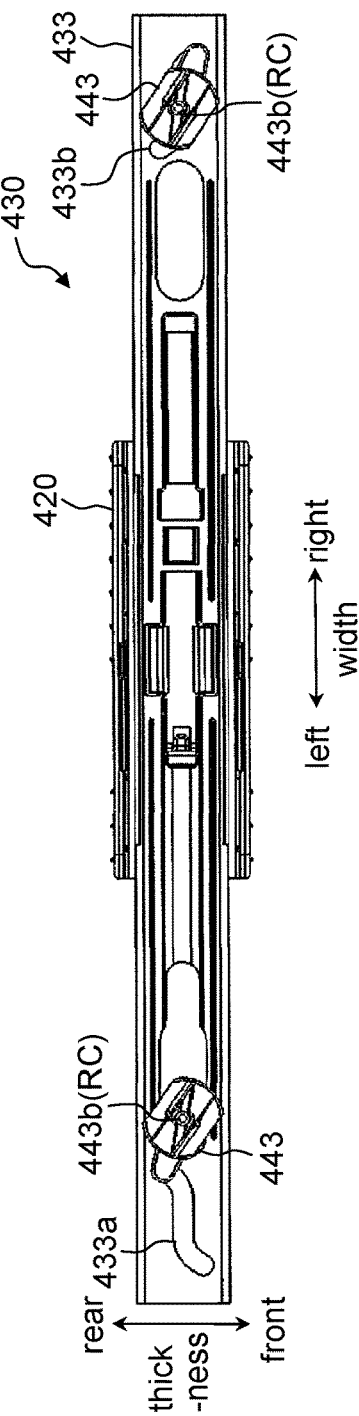
FIG. 15A is a plan view of a coupling member, an operating member, and the engaging members, all of which are components of the locking mechanism of the electronic device according to the exemplary embodiment in which the operating member is in first position, and the engaging members are in first rotation position.
Figure 15B:
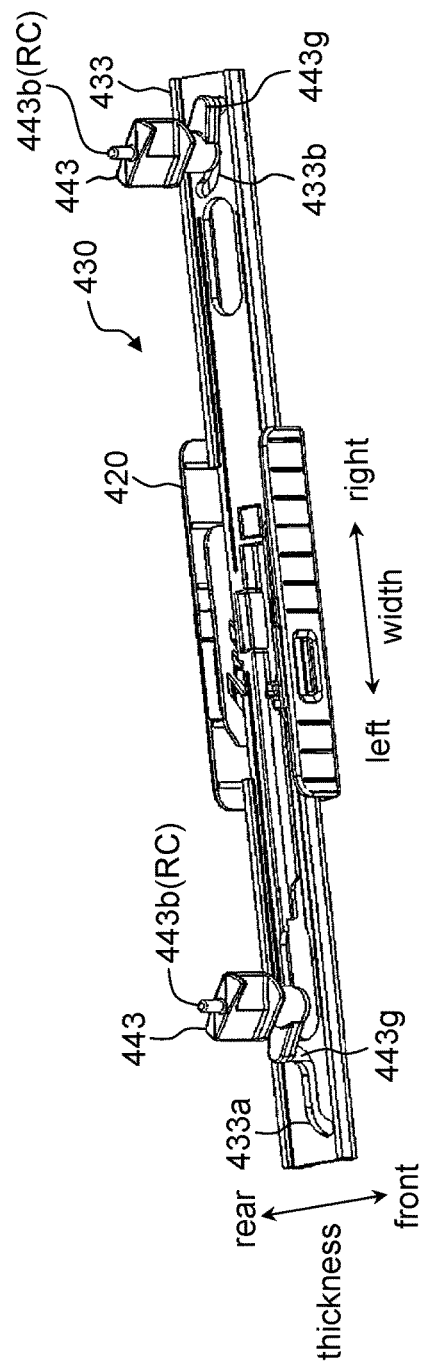
FIG. 15B is a perspective view of the coupling member, the operating member, and the engaging members, all of which are components of the locking mechanism of the electronic device according to the exemplary embodiment in which the operating member is in the first position, and the engaging members are in the first rotation position.
Figure 17A:
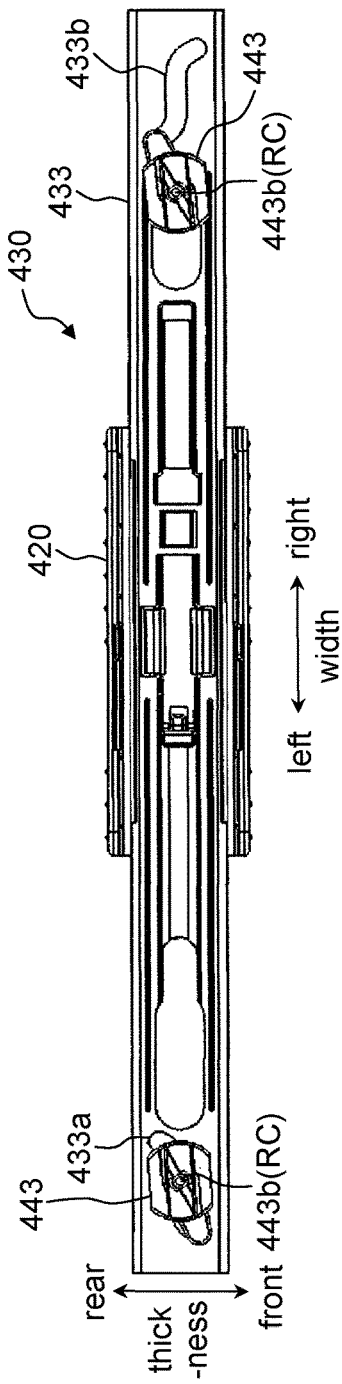
FIG. 17A is a plan view of the coupling member, the operating member, and the engaging members, all of which are components of the locking mechanism of the electronic device according to the exemplary embodiment in which the operating member is in second position, and the engaging members are in second rotation position.
Figure 17B:
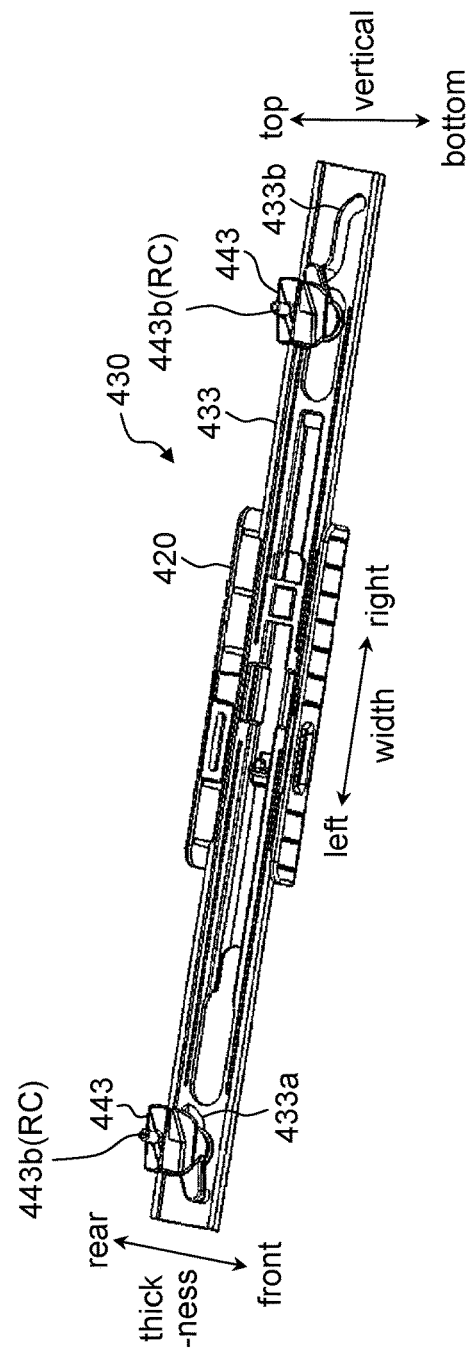
FIG. 17B is a perspective view of the coupling member, the operating member, and the engaging members, all of which are components of the locking mechanism of the electronic device according to the exemplary embodiment in which the operating member is in the second position, and the engaging members are in the second rotation position.

Grooves 433a and 433b have a meandering shape for the following reason. When operating member 420 is moved to the first position as shown in FIGS. 15A and 15B, engaging members 443 are rotated to the first rotation position about the axis of rotation RC (the center of rotating shaft 443b). Similarly when operating member 420 is moved to the second position as shown in FIGS. 17A and 17B, engaging members 443 are rotated to the second rotation position about the axis of rotation RC. More specifically, groove 433a has a shape like an inverted S in such a manner that the left end of the width is closer to the front of the thickness than the remaining portion, whereas the right end of the width is closer to the rear of the thickness than the remaining portion. Meanwhile, groove 433b has a shape like an S in such a manner that the left end of the width is closer to the rear of the thickness than the remaining portion, whereas the right end of the width is closer to the front of the thickness than the remaining portion.

Referring back to FIGS. 12A to 12C, base 432 is along the width of socket 400 and is fixed to socket body 410. Base 432 is made, for example, of resin, and includes rotation-center shafts 432a and rotation control walls 432b.

Rotation center shafts 432a are inserted into shaft holes 443f perforated at the bottoms of engaging members 443. These shafts 432a support engaging members 443 at their bottoms so as to make engaging members 443 rotatable.

Rotation control walls 432b come into contact with arms 443h located at the bottom of engaging members 443 during the rotation of engaging members 443. Walls 432b control the rotation of engaging members 443 within the range from the first rotation position to the second rotation position.

Referring back to FIGS. 7A and 7B, support members 431 are located at both ends of the width of socket 400. Support members 431 are planar members laid along the width of socket 400 and are fixed to socket body 410. Support members 431 are made, for example, of metal. Each support member 431 includes base part 431a, engaging-member supporter 431b, and engaging-member hole 431d.

Base parts 431a, which are mounted on base 432, are fixed to base 432 and socket body 410.

Engaging-member holes 431d vertically penetrate socket 400 in base parts 431a. The tops of engaging members 443 are rotatably fitted into holes 431d, so that engaging members 443 protrude higher than the top surfaces of base parts 431a.

Engaging-member supporters 431b are shaped like gates and each stands over engaging-member hole 431d on base part 431a along the width. Engaging-member supporters 431b have rotating-shaft holes 431c penetrating engaging-member supporters 431b in vertical direction of socket 400. Engaging-member supporters 431b support engaging members 443 at their tops so that engaging members 443 are rotatable about rotating shafts 443b, which are inserted into rotating-shaft holes 431c.

1-2-2-4-2. Engaging Members

Figure 13A:
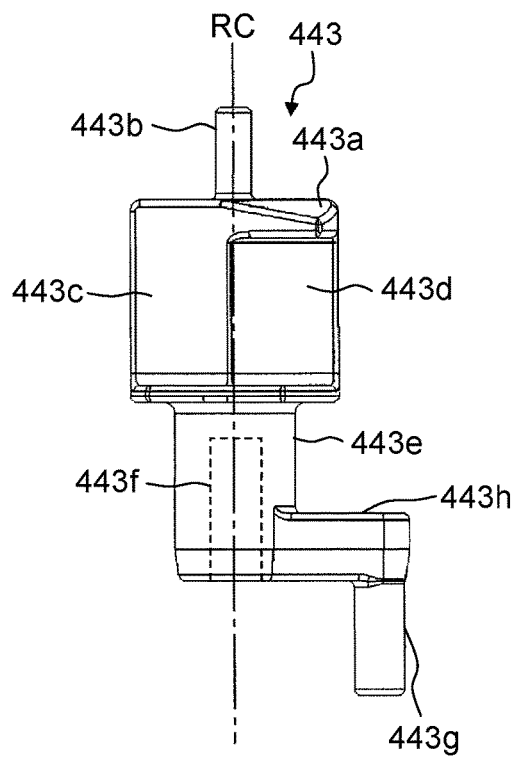
FIG. 13A is a front view of the engaging members as components of the locking mechanism of the electronic device according to the exemplary embodiment.
Figure 13B:
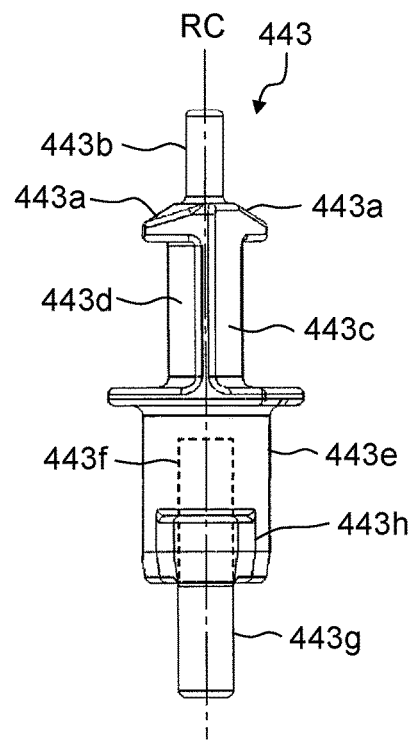
FIG. 13B is a side view of the engaging members as components of the locking mechanism of the electronic device according to the exemplary embodiment.
Figure 13C:
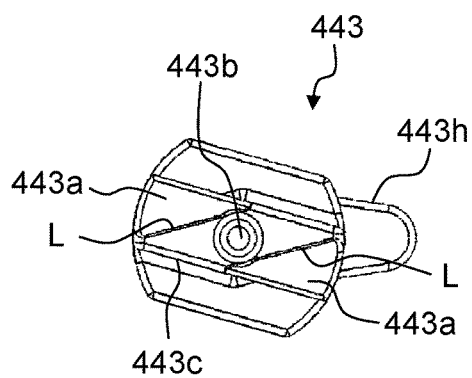
FIG. 13C is a plan view of the engaging members as components of the locking mechanism of the electronic device according to the exemplary embodiment.

FIGS. 13A to 13C are external views of engaging members 443 as components of the locking mechanism of electronic device 1. More specifically, FIG. 13A is a front view, FIG. 13B is a side view, and FIG. 13C is a plan view of engaging members 443.

Each engaging member 443 includes rotating shaft 443b mentioned above, engaging body 443c, cylindrical portion 443e, arm 443h, and engaging shaft 443g from top to bottom as shown in FIGS. 13A, 13B, and 13C.

Rotating shafts 443b are located at the top ends of engaging members 443.

Each engaging body 443c includes the pair of engaging pieces 443a, which straddle rotating shaft 443b and protrude in the radial direction. Each engaging piece 443a is formed as follows. A cylindrical body is parallelly cut at its sides straddling rotating shaft 443b (the axis of rotation RC), and the cylindrical body is further cut at portions that are radially outside the lines L and that exclude the top surface and its vicinity of the cylindrical body.

Cylindrical portions 443e have shaft holes 443f each having an open bottom. Shaft holes 443f are coaxial with rotating shafts 443b.

Arms 443h extend outward in the radial direction from the bottoms of cylindrical portions 443e.

Engaging shafts 443g extend downward in parallel with rotating shafts 443b (the axis of rotation RC) from the radial ends of arms 443h.

Figure 14:
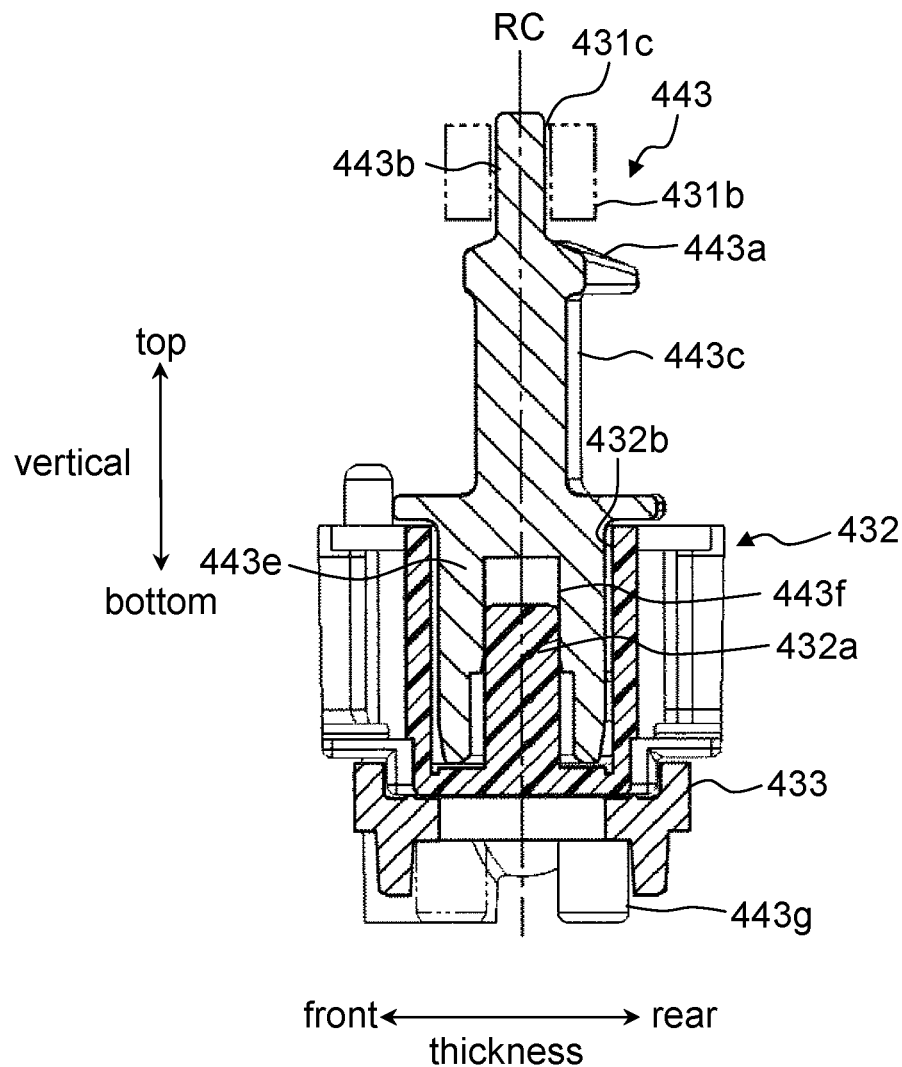
FIG. 14 is a sectional view of some components of the locking mechanism taken along line 14-14 of FIG. 12B.

FIG. 14 is a sectional view of the components of the locking mechanism taken along line 14-14 of FIG. 12B. In FIG. 14, operating member 420 is in the first position, and engaging member 443 is in the first rotation position. Rotating shaft 443b is inserted into rotating-shaft hole 431c. Shaft hole 443f is fitted around rotation-center shaft 432a of base 432. Shaft hole 443f is coaxial with rotating shaft 443b as mentioned above, so that engaging member 443 can rotate about rotating shaft 443b and shaft hole 443f as the axis of rotation RC.

2. Action

FIGS. 15A and 15B are external views of coupling member 433, operating member 420, and engaging members 443, all of which are components of the locking mechanism of electronic device 1. More specifically, FIG. 15A is a plan view and FIG. 15B is a perspective view of the components of the locking mechanism when operating member 420 is in the first position, and engaging members 443 are in the first rotation position.

Figure 16A:
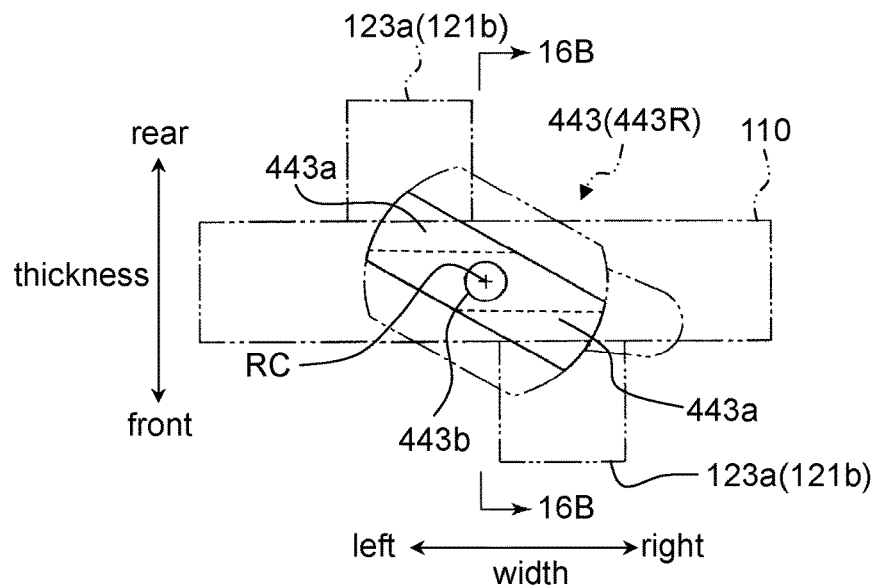
FIG. 16A is a plan view of the locking mechanism of the electronic device according to the exemplary embodiment when the mechanism is engaged.
Figure 16B:
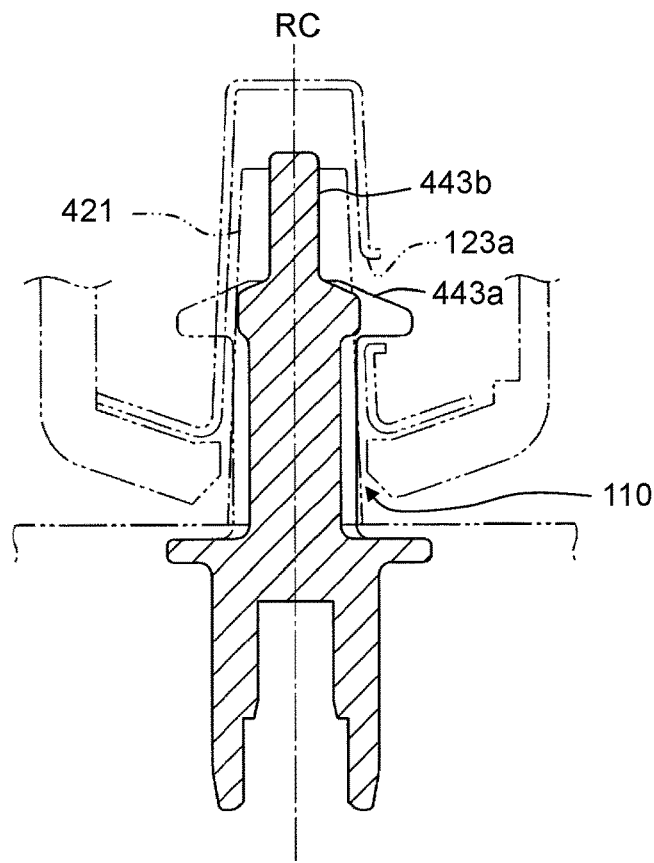
FIG. 16B is a sectional view of the locking mechanism taken along line 16B-16B of FIG. 16A.

FIGS. 16A and 16B show the locking mechanism of electronic device 1 at the right of the width when the mechanism is engaged. More specifically, FIG. 16A is a plan view of the locking mechanism when the mechanism is engaged, and FIG. 16B is a sectional view of the locking mechanism taken along line 16B-16B of FIG. 16A.

As shown in FIGS. 15A and 15B, when operating member 420 is in the first position, engaging shaft 443g of the right-hand engaging member 443 is located at the right end of groove 433b of coupling member 433. Engaging member 443 is in the first rotation position as a result that engaging shaft 443g is moved to the front of the thickness by groove 433b. At this moment, as shown in FIGS. 16A and 16B, engaging piece 443a of engaging member 443 gets engaged with engagement recess 121b of to-be-engaged portion 110 of first unit 100. As a result, first unit 100 is locked into socket 400.

If operating member 420 is moved to the second position, the condition shown in FIGS. 17A, 17B, 18A, and 18B is achieved.

FIGS. 17A and 17B are external views of coupling member 433, operating member 420, and engaging members 443, all of which are components of the locking mechanism of electronic device 1. More specifically, FIG. 17A is a plan view and FIG. 17B is a perspective view of the components of the locking mechanism when operating member 420 is in the second position, and engaging members 443 are in the second rotation position.

Figure 18A:
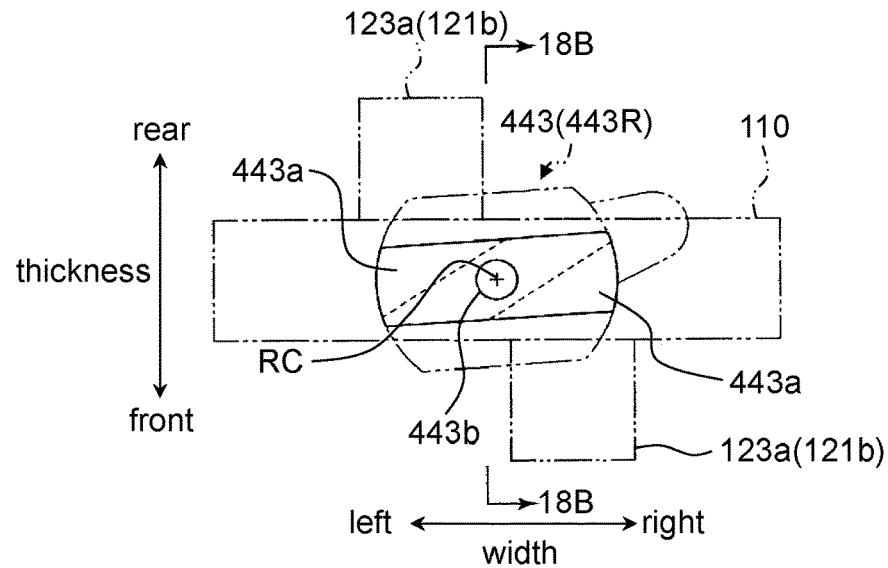
FIG. 18A is a plan view of the locking mechanism of the electronic device according to the exemplary embodiment when the locking mechanism is disengaged.
Figure 18B:
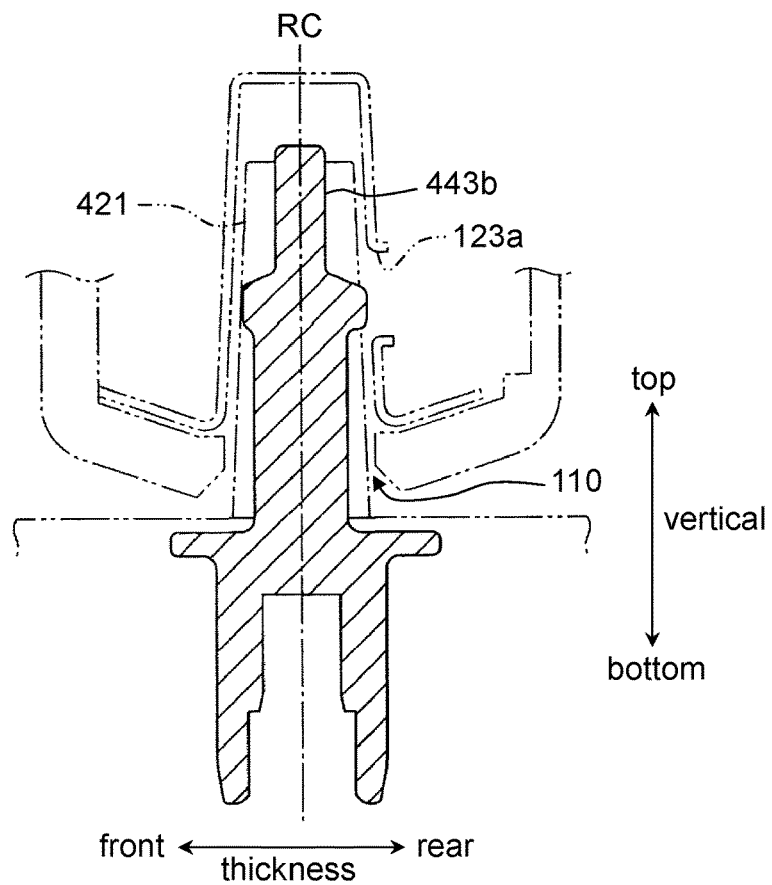
FIG. 18B is a sectional view of the locking mechanism taken along line 18B-18B of FIG. 18A.

FIGS. 18A and 18B show the locking mechanism of electronic device 1 at the right of the width when the mechanism is disengaged. More specifically, FIG. 18A is a plan view of the locking mechanism when it is disengaged, and FIG. 18B is a sectional view of the locking mechanism taken along line 18B-18B of FIG. 18A.

As shown in FIGS. 17A and 17B, when operating member 420 is in the second position, engaging shaft 443g of the right-hand engaging member 443 is located at the left end of groove 433b of coupling member 433. Engaging member 443 is in the second rotation position as a result that engaging shaft 443g is moved to the rear of the thickness by groove 433b. As this moment, as shown in FIGS. 18A and 18B, engaging piece 443a of engaging member 443 gets disengaged from engagement recess 121b of to-be-engaged portion 110 of first unit 100. As a result, first unit 100 is unlocked from socket 400, and hence detached from second unit 200.

3. Effects 3-1. Socket Body

How the Present Disclosure has Come About

According to the electronic device of PTL 1, when the tablet computer and the station are coupled together, the computer is supported by the station mainly by the engagement between a pair of projections located at both ends of the width of the station, and a pair of to-be-engaged portions located at both ends of the width of the computer. Therefore, if subjected to a pressure coming from the front or side, the computer may become wobbly or unstable.

Hence, the present disclosure has an object of providing an electronic device and a locking mechanism used in the device, in which the first unit can be stably attached to the attachment part of the second unit.

Structure of the Present Exemplary Embodiment

Electronic device 1 according to the present exemplary embodiment includes first unit 100 including display unit 101, and second unit 200 including an input part. First unit 100 and second unit 200 are detachable from each other.

First unit 100 has first main surface 100a including display unit 101, and second main surface 100b substantially parallel to first main surface 100a. Second unit 200 includes input unit 300 including the input part, socket 400 capable of accommodating the bottom 100S (the first edge part) of first unit 100, and hinge 500 coupling input unit 300 and socket 400 together at the back 300S (the second edge part) of input unit 300 and at the bottom 400S (the third edge part) of socket 400, so that input unit 300 and socket 400 are rotatable with respect to each other.

Socket 400 has first wall 410a and second wall 410b. First wall 410a becomes parallel to the longitudinal side of the bottom 100S of first unit 100 and supports the bottom 100S from first main surface 100a when the bottom 100S is accommodated in socket 400. Second wall 410b becomes parallel to the longitudinal side of the bottom 100S and supports the bottom 100S from second main surface 100b when the bottom 100S is accommodated in socket 400.

In first wall 410a and second wall 410b, the length L1 of the portion to support both ends of the longitudinal side of the bottom 100S is greater than the length L2 of the portion to support the region other than both ends of the longitudinal side of the bottom 100S. The lengths L1 and L2 are perpendicular to the longitudinal side of the bottom 100S.

According to the present exemplary embodiment, socket 400 has first wall 410a and second wall 410b. First wall 410a becomes parallel to the longitudinal side of the bottom 100S of first unit 100 and supports the bottom 100S from first main surface 100a when the bottom 100S is accommodated in socket 400. Second wall 410b becomes parallel to the longitudinal side of the bottom 100S and supports the bottom 100S from second main surface 100b when the bottom 100S is accommodated in socket 400. As a result, first unit 100 is supported at the bottom 100S by socket 400 with first main surface 100a and second main surface 100b sandwiched between first wall 410a and second wall 410b of socket 400. As described above, in first wall 410a and second wall 410b, the length L1 of the portion to support both ends of the longitudinal side of the bottom 100S is greater than the length L2 of the portion to support the region other than both ends of the longitudinal side of the bottom 100S. The lengths L1 and L2 are perpendicular to the longitudinal side of the bottom 100S. Consequently, first unit 100 can be supported at both ends by first and second walls 410a and 410b having a greater vertical height than in the middle region. As a result, first unit 100 can be firmly held in socket 400 of second unit 200.

According to the present exemplary embodiment, socket 400 further has third wall 410c and fourth wall 410d. Third wall 410c couples first wall 410a and second wall 410b together at one end of the longitudinal side. Fourth wall 410d couples first wall 410a and second wall 410b together at the other end of the longitudinal side.

These two walls improve the strength of socket 400. For example, first wall 410a and second wall 410b are prevented from falling apart from each other, thereby more firmly supporting first unit 100 in the attachment part of second unit 200.

According to the present exemplary embodiment, electronic device 1 further includes operating switches 103 (the second operating unit) and indicators 104, which are located in the region other than both ends of the longitudinal side of the bottom 100S and on first main surface 100a of first unit 100.

With this configuration, even if operating switches 103 (the second operating unit) and/or indicators 104 are located in the region other than both ends of the longitudinal side in the bottom 100S on first main surface 100a, first unit 100 can be supported at both ends by first and second walls 410a and 410b having a greater vertical height than in the middle region.

3-2. Socket Operating Unit

How the Present Disclosure has Come About

In an electronic device in which a first unit including a display unit and a second unit including an input part are coupled together to be rotatable with respect to each other, it is preferable that these units can be engaged with or disengaged from each other by operating the operating member for lock release, regardless of their rotational relationship.

Therefore, an object of the present disclosure is to provide an electronic device in which a first unit including a display unit and a second unit including an input part are detachable from each other. The electronic device further includes an easily detachable operating member.

The Structure of the Present Exemplary Embodiment

Electronic device 1 according to the present exemplary embodiment includes first unit 100 including display unit 101, and second unit 200 including an input part. First unit 100 and second unit 200 are detachable from each other.

First unit 100 has first main surface 100a including display unit 101 and second main surface 100b substantially parallel to first main surface 100a. Second unit 200 includes input unit 300 including the input part, socket 400 capable of accommodating the bottom 100S (the first edge part) of first unit 100, and hinge 500 coupling input unit 300 and socket 400 together at the back 300S (the second edge part) of input unit 300 and at the bottom 400S (the third edge part) of socket 400, so that input unit 300 and socket 400 are rotatable with respect to each other.

Socket 400 includes socket body 410 and operating member 420 for disengaging the locking mechanism, which locks first unit 100 and second unit 200 in a manner detachable from each other.

Socket body 410 has first wall 410a, which becomes parallel to first main surface 100a when the bottom 100S (the first edge part) of first unit 100 is accommodated in socket 400, and second wall 410b, which becomes parallel to second main surface 100b when the bottom 100S is accommodated in socket 400.

Operating member 420 includes first operating unit 420a and second operating unit 420b located on the outer surface of first wall 410a and second wall 410b, respectively.

According to the present exemplary embodiment, the user can operate operating member 420 from either main surface of first unit 100.

For example, when first unit 100 is opened from second unit 200 in electronic device 1, the user can operate first operating unit 420a from first main surface 100a including display unit 101 that the user faces. Meanwhile, when first unit 100 is closed on second unit 200, the user cannot operate first operating unit 420a from first main surface 100a, but can operate second operating unit 420b from second main surface 100b.

According to the present exemplary embodiment, socket 400 has an substantially U-shaped cross section to accommodate the bottom 100S of first unit 100.

Operating member 420 has an substantially U-shaped cross section so as to be slidable on the outer surface of socket 400 in the longitudinal direction of socket 400.

According to the present exemplary embodiment, since socket 400 and operating member 420 have an substantially U-shaped cross section, the internal space of socket 400 can be effectively used to store various members and mechanisms.

In the present exemplary embodiment, the internal space of socket 400 is used to store drive mechanism 430, which disengages the locking mechanism when operating member 420 is slid to a predetermined end in the longitudinal side of socket 400.

According to the present exemplary embodiment, the internal space of socket 400 is used to store drive mechanism 430, which disengages the locking mechanism.

3-3. Locking Mechanism

How the Present Disclosure has Come About

In some well-known electronic devices, the engaging portions of the second unit are in the shape of hooks that get engaged with the to-be-engaged portions of the first unit when moved to one end of the width of the second unit, and get disengaged when moved to the other end of the width. Therefore, if a force acts on the first or second unit to move the first unit to the opposite end, the engagement between the engaging portions and the to-be-engaged portions may become unstable. Moreover, some hooks are planar perpendicular to the depth of the second unit. In this case, if a force acts on the depth of the first unit, the first unit is likely to be held unstably.

To avoid this happening, an object of the present disclosure is to provide a locking mechanism and an electronic device which secure the engagement between the first and second units.

Structure of the Present Exemplary Embodiment

In electronic device 1 according to the present exemplary embodiment including first unit 100 and second unit 200 detachable from each other, the locking mechanism can lock the engagement between first unit 100 and second unit 200.

The locking mechanism includes, in second unit 200, engaging members 443 and operating member 420. Each of engaging members 443 protrudes outside from the top surface of base part 431a (the predetermined surface of the second unit) and is rotatable about the axis of rotation RC, which is perpendicular to the top surface of base part 431a. Operating member 420 can move linearly between the first and second positions. The locking mechanism further includes to-be-engaged portions 110 in first unit 100, and drive mechanism 430 in second unit 200. When first unit 100 and second unit 200 are coupled together, to-be-engaged portions 110, which are located in the bottom 100S of first unit 100 are engaged with engaging members 443 located in the first rotation position, and disengaged from members 443 located in the second rotation position. Drive mechanism 430 makes engaging members 443 rotate to the first rotation position when operating member 420 is moved to the first position, and also makes engaging members 443 rotate to the second rotation position when operating member 420 is moved to the second position. As a result, drive mechanism 430 converts the linear movement of operating member 420 between the first and second positions into the rotation of engaging members 443 between the first and second rotation positions.

Each engaging member 443 includes one pair of engaging pieces 443a straddling the axis of rotation RC.

Each to-be-engaged portion 110 includes one pair of engagement recesses 121b. Recesses 121b are engaged with engaging pieces 443a when engaging members 443 are in the first rotation position, and are disengaged from them when engaging members 443 are in the second rotation position.

According to the present exemplary embodiment, when operating member 420 is operated, engaging members 443 are rotated about the axis of rotation RC, and each pair of engaging pieces 443a straddling the axis of rotation RC are engaged with each pair of engagement recesses 121b of to-be-engaged portions 110. Thus, according to the present exemplary embodiment, the pair of engaging pieces 443a straddling the axis of rotation RC in each engaging member 443 are rotated and engaged with the pair of engagement recesses 121b of each to-be-engaged portion 110. Assume that a force acts on first unit 100 from any of the three dimensional directions and causes engaging pieces 443a and engagement recesses 121b to move relative to each other when engaging pieces 443a and engagement recesses 121b are engaged with each other. In this case, the engagement between one of engaging pieces 443a and the corresponding engagement recess 121b may be weakened, but the engagement between the other engaging piece 443a and the corresponding engagement recess 121b is strengthened. In short, even if a force acts on first unit 100 from any of the three dimensional directions, the engagement is maintained at a constant strength in the locking mechanism as a whole, thereby securing the engagement.

In the present exemplary embodiment, drive mechanism 430 includes engaging shafts 443g and coupling member 433. In each engaging member 443, engaging shaft 443g is not coaxial but is parallel to the axis of rotation RC. Coupling member 433 is fixed to operating member 420 and movably supported by socket body 410 (a predetermined housing) of second unit 200 so that coupling member 433 can move with operating member 420. Coupling member 433 has grooves 433a and 433b that can get engaged with engaging shafts 443g of engaging members 443 in a manner movable relative to each other.

Grooves 433a and 433b have a meandering shape for the following reason. When operating member 420 is moved to the first position, engaging members 443 are rotated to the first rotation position about the axis of rotation RC. Similarly, when operating member 420 is moved to the second position, engaging members 443 are rotated to the second rotation position about the axis of rotation RC.

This enables the linear movement of operating member 420 to be converted into the rotation of engaging members 443 by a simple structure.

In electronic device 1 according to the present exemplary embodiment, the numbers of engaging members 443 and to-be-engaged portions 110 are at least two.

Drive mechanism 430 converts the linear movement of operating member 420 between the first and second positions into the rotation of engaging members 443 between the first and second rotation positions.

This structure enables the first unit and second unit 200 to be engaged with each other at a plurality of positions, thereby improving the engagement performance. The structure further makes it possible to drive two or more engaging members 443 by operating one operating member 420.

In the present exemplary embodiment, second unit 200 includes input unit 300 including keyboard 301, socket 400 capable of accommodating the bottom 100S of first unit 100, and hinge 500. Hinge 500 couples input unit 300 and socket 400 together so as to be rotatable with respect to each other at the back 300S (the second edge part) of input unit 300 and at bottom 400S (the third edge part) of socket 400.

The top surfaces of base parts 431a of second unit 200 (the predetermined surface of the second unit) face the bottom 100S of first unit 100 when the bottom 100S is accommodated in socket 400.

This enables first unit 100 and second unit 200 to be rotatable with respect to each other, thereby providing the above-described effects in electronic device 1.

In the present exemplary embodiment, drive mechanism 430 is accommodated in the internal space of socket 400.

Thus, the internal space of socket 400 is effectively used to store drive mechanism 430.

In the present exemplary embodiment, first unit 100 is a tablet computer.

Many tablet computers are made detachable from input unit 300 including a keyboard so as to facilitate typing. Furthermore, tablet computers are heavy in weight because they contain a CPU, a volatile storage device such as a RAM, a nonvolatile storage device such as a ROM or an SSD, a battery, and other components. According to the present exemplary embodiment, although first unit 100 is a tablet computer, the locking mechanism offers sturdy locking, enabling the tablet computer to be stably engaged.

Other Exemplary Embodiment

The first exemplary embodiment described so far is an example of the present disclosure. The present disclosure is not limited to this embodiment, and is applicable to other embodiments obtained by applying modification, replacement, addition, or omission.

The following is a description of the other exemplary embodiment.

In the first exemplary embodiment, second unit 200 includes input unit 300, socket 400, and hinge 500. Alternatively, however, the second unit may not include the hinge or the socket. More specifically, the second unit can be an input unit including a keyboard, and the input unit can include, on its main surface including the keyboard, a receiving part on which the bottom 100S of first unit 100 can be placed.

The predetermined surface of the second unit may be a surface that faces the bottom 100S of first unit 100 when the bottom 100S is placed on the receiving part. For example, the predetermined surface may be the top surface of the second unit (the main surface including the input part such as the keyboard). In that case, the drive mechanism may be accommodated in the internal space of the input unit.

Thus, the present disclosure has been described in detail by taking the exemplary embodiments as its examples with reference to the accompanying drawings.

Note that some of the components described in detail and shown in the accompanying drawings are not essential components for the present disclosure, and should not be regarded as essential components just because they are described in detail and shown in the accompanying drawings.

The above-described exemplary embodiments are just examples of the present disclosure, and the present disclosure is susceptible to modification, replacement, addition, or omission within the scope of the present disclosure and its equivalents.

INDUSTRIAL APPLICABILITY

The present disclosure can be widely used as electronic devices including a first unit and a second unit detachable from each other.

REFERENCE MARKS IN THE DRAWINGS 1 electronic device
100 first unit
100a first main surface
100b second main surface
100S bottom (first edge part)
101 display unit
102 lid
103 operating switch
104 indicator
110 to-be-engaged portion
120 connector
121 frame
121a recess
121b engagement recess
122 side cover
122a opening
123 protective member
123a engaging hole
200 second unit
300 input unit
300a main surface
300S back (second edge part)
301 keyboard
302 touch pad 303 operating button
400 socket
400a recess
400S bottom (third edge part)
410 socket body
410a first wall
410b second wall
410c third wall
410d fourth wall
410e opening-side end
420 operating member
430 drive mechanism
431 support member
431a base part
431b engaging-member supporter
431c rotating-shaft hole
431d engaging-member hole
432 base
432a rotation-center shaft
432b rotation control wall
433 coupling member
433a, 433b groove
440 engaging portion
443 engaging member
443a engaging piece
443b rotating shaft
443c engaging body
443e cylindrical portion
443f shaft hole
443g engaging shaft
443h arm
460 connector
500 hinge
HC axis of rotation (of the hinge)
L line
L1 length of both ends of the width
L2 length of the region other than both ends of the width
RC axis of rotation

The invention claimed is:

1. An electronic device comprising:
a first unit comprising:
  a first main surface including a display unit; and
  a second main surface substantially parallel to the first main surface; and
a second unit comprising:
  an input unit including an input part;
  a socket configured to accommodate a first edge part of the first unit; and
  a hinge coupling the input unit and the socket together at a second edge part of the input unit and at a third edge part of the socket so that the input unit and the socket are rotatable with respect to each other, the first unit and the second unit being detachable from each other,
wherein the socket comprises:
a first wall configured to be parallel to a longitudinal side of the first edge part so as to support the first edge part from the first main surface when the first edge part is accommodated in the socket; and
a second wall configured to be parallel to the longitudinal side of the first edge part so as to support the first edge part from the second main surface when the first edge part is accommodated in the socket,
wherein each of the first wall and the second wall comprises:
a pair of portions configured to support both ends of the longitudinal side of the first edge part; and
a portion configured to support a region other than both ends of the longitudinal side of the first edge part, at least one of the pair of portions having a length greater than a length of the portion configured to support the region other than both ends of the longitudinal side of the first edge part, both of the lengths being perpendicular to the longitudinal side of the first edge part,
wherein the portion configured to support the region other than both ends of the longitudinal side of the first edge part has a linear opening-side end parallel to the longitudinal side of the first edge part when the first wall and the second wall are seen vertically,
wherein the socket includes an engaging member configured to rotate about a rotation axis that is perpendicular to the longitudinal side, the engaging member including a pair of engaging pieces straddling the rotation axis, and
wherein the pair of engaging pieces is engaged with a to-be-engaged portion of the first unit by rotating about the rotation axis.

2. The electronic device according to claim 1, wherein the socket further comprises:
a third wall coupling the first wall and the second wall together at one end of the longitudinal side of the first edge part; and
a fourth wall coupling the first wall and the second wall together at an other end of the longitudinal side of the first edge part.

3. The electronic device according to claim 1, further comprising at least one of a second input part and an indicator in the region other than both ends of the longitudinal side of the first edge part, the at least one of the second input part and the indicator being located in the first edge part on the first main surface of the first unit.

* * * * *